US010218229B2

(12) United States Patent
Alperin et al.

(10) Patent No.: US 10,218,229 B2
(45) Date of Patent: Feb. 26, 2019

(54) SYSTEMS AND METHODS FOR MANAGING A DISTRIBUTED WIRELESS POWER TRANSFER NETWORK FOR ELECTRICAL DEVICES

(71) Applicant: POWERMAT TECHNOLOGIES LTD., Neve Ilan (IL)

(72) Inventors: Eduardo Alperin, Raanana (IL); Yuval Koren, Rehovot (IL); Ami Oz, Azor (IL); Nadav Reuveni, Mevasseret Zion (IL); Rachel Ben Hanoch, Givat Shmuel (IL); Ian Podkamien, Petach Tikva (IL); Itay Sherman, Hod Hasharon (IL)

(73) Assignee: POWERMAT TECHNOLOGIES LTD., Neve Ilan (IL)

( * ) Notice: Subject to any disclaimer, the term of this patent is extended or adjusted under 35 U.S.C. 154(b) by 188 days.

(21) Appl. No.: 14/771,271

(22) PCT Filed: Feb. 27, 2014

(86) PCT No.: PCT/IL2014/050203
§ 371 (c)(1),
(2) Date: Aug. 28, 2015

(87) PCT Pub. No.: WO2014/132258
PCT Pub. Date: Sep. 4, 2014

(65) Prior Publication Data
US 2016/0006264 A1 Jan. 7, 2016

Related U.S. Application Data

(60) Provisional application No. 61/770,341, filed on Feb. 28, 2013, provisional application No. 61/923,585, (Continued)

(51) Int. Cl.
*H01F 27/42* (2006.01)
*H02J 50/80* (2016.01)
(Continued)

(52) U.S. Cl.
CPC ............. *H02J 50/80* (2016.02); *H02J 5/005* (2013.01); *H02J 50/10* (2016.02);
(Continued)

(58) Field of Classification Search
CPC .. H02J 7/025; H02J 50/12; H02J 50/10; H02J 50/80
See application file for complete search history.

(56) References Cited

U.S. PATENT DOCUMENTS 8,922,329 B2  12/2014  Davis et al.
9,088,171 B2   7/2015  Won et al.
2012/0112692 A1* 5/2012 Arai .................. G06Q 50/06
                                                   320/108

FOREIGN PATENT DOCUMENTS

JP  2008017026 A  1/2008
JP  2009213295 A  9/2009
(Continued)

*Primary Examiner* — Sibin Chen
(74) *Attorney, Agent, or Firm* — William Dippert; Laurence Greenberg; Werner Stemer

(57) ABSTRACT

The disclosure relates to systems and methods for managing a wireless power transfer network for power transfer to electrical devices, providing central management console in communication with cloud based network, comprising at least one wireless power outlet and at least one management server. The management system, of the current disclosure, is enabling remote health check and maintenance of all of wireless power outlets within the network. Further, the management system allows for complete monitoring of a deployment according to system administrator rights and policy management coupled with command and control
(Continued)

functioning to determine allowed/disallowed functionality while transferring powering to an electrical device in a specific venue.

20 Claims, 15 Drawing Sheets

Related U.S. Application Data filed on Jan. 3, 2014, provisional application No. 61/935,502, filed on Feb. 4, 2014, provisional application No. 61/935,356, filed on Feb. 4, 2014, provisional application No. 61/935,854, filed on Feb. 5, 2014.

(51) Int. Cl.
*H02J 50/10* (2016.01)
*H04W 52/02* (2009.01)
*H02J 5/00* (2016.01)
*H02J 50/00* (2016.01)

(52) U.S. Cl.
CPC ... *H04W 52/0216* (2013.01); *H04W 52/0219* (2013.01); *H02J 50/00* (2016.02)

(56) References Cited

FOREIGN PATENT DOCUMENTS

| | | |
|---|---|---|
| JP | 2012015629 A | 1/2012 |
| JP | 2013500693 A | 1/2013 |
| WO | 2011112060 A2 | 9/2011 |
| WO | 2013102908 A1 | 7/2013 |

* cited by examiner

SYSTEMS AND METHODS FOR MANAGING A DISTRIBUTED WIRELESS POWER TRANSFER NETWORK FOR ELECTRICAL DEVICES

CROSS-REFERENCE TO RELATED APPLICATIONS

This application is a. U.S. National Phase Application under 35 U.S.C. § 371 of International Application No. PCT/IL2014/050203, which has an international filing date of Feb. 27, 2014, and which claims priority and benefit from U.S. Provisional Applications Ser. No. 61/770,341, filed Feb. 28, 2013, Ser. No. 61/923,585, filed Jan. 3, 2014, Ser. No. 61/935,502 filed Feb. 4, 2014, Ser. No. 61/935,356 filed Feb. 4, 2014, and Ser. No. 61/935,854, filed Feb. 5, 2014, the full contents and disclosures of which are incorporated herein by reference in their entirety.

FIELD OF THE INVENTION

The disclosure herein relates to systems and methods for managing a wireless power transfer network for electrical devices. In particular the invention relates to a cloud based network management system of wireless power outlets enabling remote health check, maintenance and policy management along with command and control of the network elements.

BACKGROUND OF THE INVENTION

The spread of mobile devices such as mobile handsets, media players, tablet computers and laptops/notebooks/netbooks and ultra-books increases user demand for access to power points at which they may transfer power to charge mobile devices while out and about or on the move.

There is a need for systems that conveniently provide the opportunity to transfer power for charging the electrical devices in public spaces, in which the user of the mobile device may remain for extended periods of time, say more than a few minutes or so. Amongst others, such public spaces may include restaurants, coffee shops, airport lounges, trains, buses, taxis, sports stadia, auditoria, theatres, cinemas or the like. Further, there is a need for such systems to enable easy tracking of power transfer locations in public spaces as soon as the need arises, that is, when the battery level runs low, while power transfer locations around current location may answer user expectations.

Such systems may be distributed over various venues, requiring complex network architecture to provide the demand for wireless power transfer in public spaces.

The invention below addresses the above-described needs.

SUMMARY OF THE INVENTION

It is according to one aspect of the disclosure to present a system for managing a wireless power transfer network comprising: at least one wireless power outlet unit operable to transfer power to at least one electrical device associated with a wireless power receiver; and at least one management server in communication with the at least one wireless power outlet unit, the at least one management server is operable to execute instructions directed to: receiving an identification code from the at least one wireless power outlet unit; and managing power transfer from the at least one wireless power outlet unit.

Optionally, the at least one management server of the system may further be operable to execute instructions directed to: monitoring health of said at least one wireless power outlet unit; and providing remote maintenance of said at least one wireless power outlet unit.

Where appropriate, the at least one management server of the system is further operable to communicate with the at least one electrical device.

Where appropriate, the system for managing power transfer may be governed by at least one power management policy, wherein the at least one power management policy determines power transfer conditions for the at least one wireless power outlet unit.

Optionally, the at least one power management policy is selected from a group consisting of: user identification policies, type of service policies, type of device policies, dynamic policies and combinations thereof.

Optionally, the at least one power management policy is selected for the at least one wireless power outlet unit according to the identification code.

Optionally, the at least one wireless power outlet unit has a default power management policy to determine default_power transfer conditions.

Additionally or alternatively, the selected power management policy replaces the power management default policy.

Optionally, the at least one power management policy is distributed in response to a change of the at least one power management policy on the at least one management server.

Optionally, the at least one power management policy is distributed according to a distribution schedule.

Optionally, the at least one power management policy is distributed upon a communication request from the at least one wireless power outlet unit.

Where appropriate, the user identification policies comprise actions selected from the group consisting of: user identification, location identification, starting time, ending time, duration of power transfer and combinations thereof.

Where appropriate, the type of service policies determine the level of current applied at power transfer from said at least one wireless power outlet.

Where appropriate, the dynamic policies comprise actions selected from the group consisting of: real time management of power consumption, real time management of battery health, location traffic control and combinations thereof.

In various embodiments of the disclosure, providing remote maintenance comprises performing a step selected from a group consisting of: starting, stopping, restarting, software updating, controlling a visual user interface, controlling a user audio interface and combinations thereof.

In various embodiments of the disclosure, monitoring health comprises the wireless power outlet responding to a communication signal within a time-out limit Optionally, the communication signal is transmitted according to a schedule.

Optionally, the communication signal is transmitted upon demand.

In another aspect of the disclosure a computer implemented method is taught for managing a wireless power transfer network, where the wireless power transfer network comprising: (1) at least one wireless power outlet unit operable to transfer power to at least one electrical device associated with a wireless power receiver; and (2) at least one management server in communication with said at least one one wireless power outlet unit, the method comprising the steps of: the at least one management server, receiving an identification code from the at least one wireless power outlet unit; and the at least one management server, managing power transfer from the at least one wireless power outlet unit.

The method may further comprise the steps of: the at least one management server, monitoring health of the at least one wireless power outlet unit; and the at least one management server, providing remote maintenance of the at least one wireless power outlet unit.

Additionally or alternatively, the method is further operable to communicate with the at least one electrical device through the at least one management server.

Optionally, the step of managing power transfer is governed by at least one power management policy, wherein the at least one power management policy is configured to set power transfer conditions for the at least one wireless power outlet unit.

Optionally, the at least one power management policy is selected from a group consisting of: user identification policies, type of service policies, type of device policies, dynamic policies and combinations thereof.

Optionally, the at least one power management policy is selected for said at least one wireless power outlet unit according to the identification code.

Optionally, the at least one wireless power outlet unit is configured with a default power management policy to determine default power transfer conditions.

Where appropriate, the selected power management policy replaces said power management default policy.

Optionally, the at least one power management policy is further distributed in response to a change of the at least one power management policy on the at least one management server.

Optionally, the at least one power management policy is distributed according to a distribution schedule.

Optionally, the at least one power management policy is distributed upon a communication request from the at least one wireless power outlet unit.

Optionally, the user identification policies comprise actions selected from the group consisting of: user identification, location identification, starting time, ending time, duration of power transfer and combinations thereof.

Optionally, the type of service policies determine the level of current applied at power transfer from the at least one wireless power outlet.

Optionally, dynamic policies comprise actions selected from the group consisting of: real time management of power consumption, real time management of battery health, location traffic control and combinations thereof.

As appropriate, the step of providing remote maintenance comprises performing a step selected from a group consisting of: starting, stopping, restarting, software updating, controlling a visual user interface, controlling a user audio interface and combinations thereof.

As appropriate, the step of monitoring health comprises said wireless power outlet responding to a communication signal within a time-out limit.

Optionally, the communication signal is transmitted according to a schedule.

Optionally, the communication signal is transmitted upon demand.

Another aspect of the disclosure is to teach a method for managing a wireless power transfer network comprising at least one management server in communication with at least one wireless power outlet unit, the method comprising at least one management processor executing instructions to perform operations comprising: receiving at least one status report message from the power outlet unit; processing the at least one status report message; and sending at least one response message to the at least one power outlet unit.

Variously, the management processor is operable to receive the at least one status report message periodically. Optionally the status report message comprises data pertaining to an operational mode of the power outlet unit, which may take a value selected from: CHARGING and NOT-CHARGING.

Optionally, the step of processing the at least one status report message comprises determining appropriate values for at least one control signal. The at least one response message may comprise the control signal. Accordingly, the control signal may comprise a COMMAND parameter, the COMMAND parameter having at least one value selected from: a CHARGE value operable to instruct the power outlet unit to transfer power to a wireless power receiver, and a DO-NOT-CHARGE operable to instruct the power outlet unit not to transfer power to the wireless power receiver. Additionally and alternatively the control signal may comprise an INTERVAL parameter, the INTERVAL parameter having a value selected to instruct the power outlet unit to send at least a second status report message after a delay of length determined by the value. Additionally and alternatively the control signal may comprise a request for an extended report message. Additionally and alternatively the control signal may comprise a request for a configuration report message.

Another aspect of the disclosure is to teach a method for managing a wireless power transfer network comprising at least one management server in communication with at least one wireless power outlet unit, the method comprising at least one power outlet processor executing instructions to perform operations comprising: sending at least one status report message to the management server; receiving at least one response message from the management server; and executing instructions encoded in control signals included in the response message.

Optionally, the power outlet processor is operable to send the at least one status report message periodically. Optionally, the status report message comprises data pertaining to an operational mode of the power outlet unit, a transmitter identification code associated with the power outlet unit, a wireless power receiver coupled with the power outlet unit, operational information.

Variously the step of executing instructions may comprise detecting a COMMAND parameter and transferring power to a wireless power receiver if the COMMAND parameter has a value of CHARGE, or terminating transferring of power to a wireless power receiver if the COMMAND parameter has a value of DO-NOT-CHARGE. Additionally and alternatively the step of executing instructions may comprise at least one of: detecting an INTERVAL parameter and sending at least a second status report message after a delay of length determined by the value; and sending an extended report message to the management server. The extended report message may comprise data pertaining to operating temperature of at least one element of the power outlet, operating current of at least one circuit of the power outlet, or operating voltage of the power outlet.

Another aspect of the disclosure is to teach a method for managing a wireless power transfer network comprising at least one management server in communication with at least one wireless power outlet unit, the method comprising at least one power outlet processor executing instructions to perform operations comprising: sending at least one configuration report message to the management server; receiving at least one configuration response message from the management server; and executing instructions encoded in configuration command included in the configuration response message.

Optionally, the power outlet processor is operable to send the at least one configuration report message periodically, and/or upon start up. Variously, the configuration report message may comprise data pertaining to at least one of: transmitter identification code associated with the power outlet unit, a receiver identification code associated with a wireless power receiver coupled with the power outlet unit at least one software or firmware version executed by the power outlet processor, a hardware version of the power outlet unit, or the reason for sending the configuration report message.

Optionally, the power outlet unit communicates with the management server via a communication module and the configuration report message comprises data pertaining to a gateway identification code associated with the communication module.

Where appropriate, the step of executing instructions comprises updating at least one software version executed by the power outlet processor for example by detecting a software package version code and updating to the software package; disabling the power outlet; restarting the power outlet; enabling optical feedback; disabling optical feedback; enabling audio feedback; disabling audio feedback; setting a current limit for the power outlet; setting a voltage limit for the power outlet; setting a sensitivity level for sensors associated with the power outlet or the like.

Another aspect of the disclosure is to teach a method for managing a wireless power transfer network comprising at least one management server in communication with at least one wireless power outlet unit, the method comprising at least one management processor executing instructions to perform operations comprising: receiving at least one configuration report message from the power outlet unit; processing the at least one configuration report message; and sending at least one configuration response message to the at least one power outlet unit.

Optionally, the configuration report message comprises data pertaining to a transmitter identification code associated with the power outlet unit, a receiver identification code associated with a wireless power receiver coupled with the power outlet unit, and/or, where the power outlet units communicates with the management server via a communication module, a gateway identification code associated with the communication module. Furthermore, the configuration report message may comprise data pertaining to at least one software or firmware version executed by the power outlet processor, a hardware version of the power outlet unit; or the reason for sending the configuration report message.

Accordingly, the step of processing the configuration report message may comprise determining appropriate values for at least one configuration command. Variously, the at least one configuration response message comprises the at least one configuration command which may comprise a parameter such as a CHARGER_FIRMWARE_VERSION parameter a VENDOR_ID parameter, ZB_FIRMWARE_VERSION parameter, an UPDATE_CHARGER_FIRMWARE parameter, an UPDATE_ZB_FIRMWARE parameter, a RESET parameter, a LEDS parameter, a SOUND parameter, a DISABLE_CHARGER parameter, a CURRENT_LIMIT parameter, an INDUCTION_SENSOR_SENSITIVITY parameter, and/or , a DC_PEAK_LIMIT_THRESHOLD parameter.

Another aspect of the disclosure is to teach a method for managing a wireless power transfer network comprising at least one management server in communication with at least one wireless power outlet unit via at least one communication module, the method comprising at least one management processor executing instructions to perform operations comprising: receiving at least one health report message from the communication module; processing the at least one health report message; and sending at least one response message to the at least one communication module.

Optionally, the health report message comprises data pertaining to a gateway identification code associated with the communication module and/or an error code. Accordingly, the step of processing the at least one health report message may comprise determining appropriate values for at least one control signal. Varoiusly, the at least one configuration response message comprises the at least one configuration command which may comprise a parameter such as an INTERVAL parameter, the INTERVAL parameter having a value selected to instruct the communication module unit to send at least a second health report message after a delay of length determined by the value. Additionally, or alternatively, the control signal may comprise an ALLOW-JOIN parameter instructing the communication module to add a candidate power outlet to the power transfer network.

Another aspect of the disclosure is to teach a method for managing a wireless power transfer network comprising at least one management server in communication with at least one wireless power outlet unit via at least one communication module, the method comprising, the method comprising at least one communication module processor executing instructions to perform operations comprising: sending at least one health report message to the management server; receiving at least one response message from the management server; and executing instructions encoded in control signals included in the response message.

Variously, the health report message comprises data pertaining to a gateway identification code associated with the communication module, and/or an error code.

Optionally, the step of executing instructions comprises detecting an INTERVAL parameter and sending at least a second health report message after a delay of length determined by the value. Additionally or alternatively, the step of executing instructions comprises detecting an ALLOW-JOIN parameter and adding a candidate power outlet to the power transfer network.

Another aspect of the disclosure is to teach a method for managing a wireless power transfer network comprising at least one management server in communication with at least one wireless power outlet unit via at least one communication module, the method comprising at least one management processor executing instructions to perform operations comprising: receiving at least one configuration report message from the communication module; processing the at least one configuration report message; and sending at least one configuration response message to the at least one communication module.

Variously, the configuration report message may comprises data pertaining to at least one of a gateway identification code associated with the communication module, at least one firmware version executed by the communication module, at least one firmware or software version executed by the communication module, the available memory to the communication module, the available flash memory to the communication module, the percentage utilization of a communication module processor, the available flash memory to the communication module, and/or the reason for sending the configuration report message.

Accordingly, the step of processing the configuration report message may comprise determining appropriate values for at least one configuration command. Variously, the at least one configuration response message comprises the at least one configuration command which may comprise a parameter such as a FIRMWARE_VERSION parameter, a SW_VERSION parameter, an UPDATE_FIRMWARE parameter, an UPDATE_SOFTWARE parameter, a REBOOT parameter, an AGGREGATION_INTERVAL parameter, an INIT_PAN parameter, a LOG_APPENDER parameter, a LOG_URL parameter, and/or a LOG_SIZE parameter.

Another aspect of the disclosure is to teach a method for managing a wireless power transfer network comprising at least one management server in communication with at least one wireless power outlet unit via at least one communication module, the method comprising, the method comprising at least one communication module processor executing instructions to perform operations comprising: sending at least one configuration report message to the management server; receiving at least one configuration response message from the management server; and executing instructions encoded in configuration commands included in the configuration response message.

Variously, the communication module processor may be operable to send the at least one configuration report message periodically. The configuration report message may comprise data pertaining to at least one of a gateway identification code associated with the communication module, at least one firmware version executed by the communication module, at least one software version executed by the communication module, the available memory to the communication module,the available flash memory to the communication module, the percentage utilization of a communication module processor, the available flash memory to the communication module, and/or the reason for sending the configuration report message.

Accordingly, the step of executing instructions comprises at least one of: updating at least one software version executed by the communication module processor, detecting a software package version code and updating to the software package, restarting the communication module.

Another aspect of the disclosure is to teach a method for managing a wireless power transfer network comprising at least one management server in communication with at least one communication module, the method comprising, the method comprising at least one communication module processor executing instructions to perform operations comprising: sending to the management server at least one request message to add at least one candidate wireless power outlet to the network; receiving from the management server at least one request response; and executing instructions encoded in a command included the request response.

Variously, the request message comprises data pertaining to at least one of a gateway identification code associated with the communication module and a power outlet identification code associated with the candidate power outlet module.

Accordingly, the step of executing instructions may comprises at least one of: detecting an approval command in the request response and adding the candidate wireless power outlet to the network; or detecting a non-approval command in the request response and rejecting the candidate wireless power outlet from the network.

Another aspect of the disclosure is to teach a method for managing a wireless power transfer network comprising at least one management server in communication with at least one communication module, the method comprising, the method comprising at least one management processor executing instructions to perform operations comprising: receiving from the communication module at least one request message to add at least one candidate wireless power outlet to the network; processing at least one request message; and sending at request response to the communication module.

Variously, the request message comprises data pertaining to at least one of a gateway identification code associated with the communication module and a power outlet identification code associated with the candidate power outlet module.

Accordingly, the step of processing the at least one request message comprises including an approval command in the request response, or including a non-approval command in the request response.

BRIEF DESCRIPTION OF THE DRAWINGS

For a better understanding of the embodiments and to show how it may be carried into effect, reference will now be made, purely by way of example, to the accompanying drawings.

With specific reference now to the drawings in detail, it is stressed that the particulars shown are by way of example and for purposes of illustrative discussion of selected embodiments only, and are presented in the cause of providing what is believed to be the most useful and readily understood description of the principles and conceptual aspects. In this regard, no attempt is made to show structural details in more detail than is necessary for a fundamental understanding; the description taken with the drawings making apparent to those skilled in the art how the several selected embodiments may be put into practice. In the accompanying drawings:

FIG. 5C is a schematic representation of possible power transfer network view, accessible on a management console, enabling selection of a wireless power outlet for further actions such as execution of remote restarts, software updates and the like;

DETAILED DESCRIPTION

Figure 1:
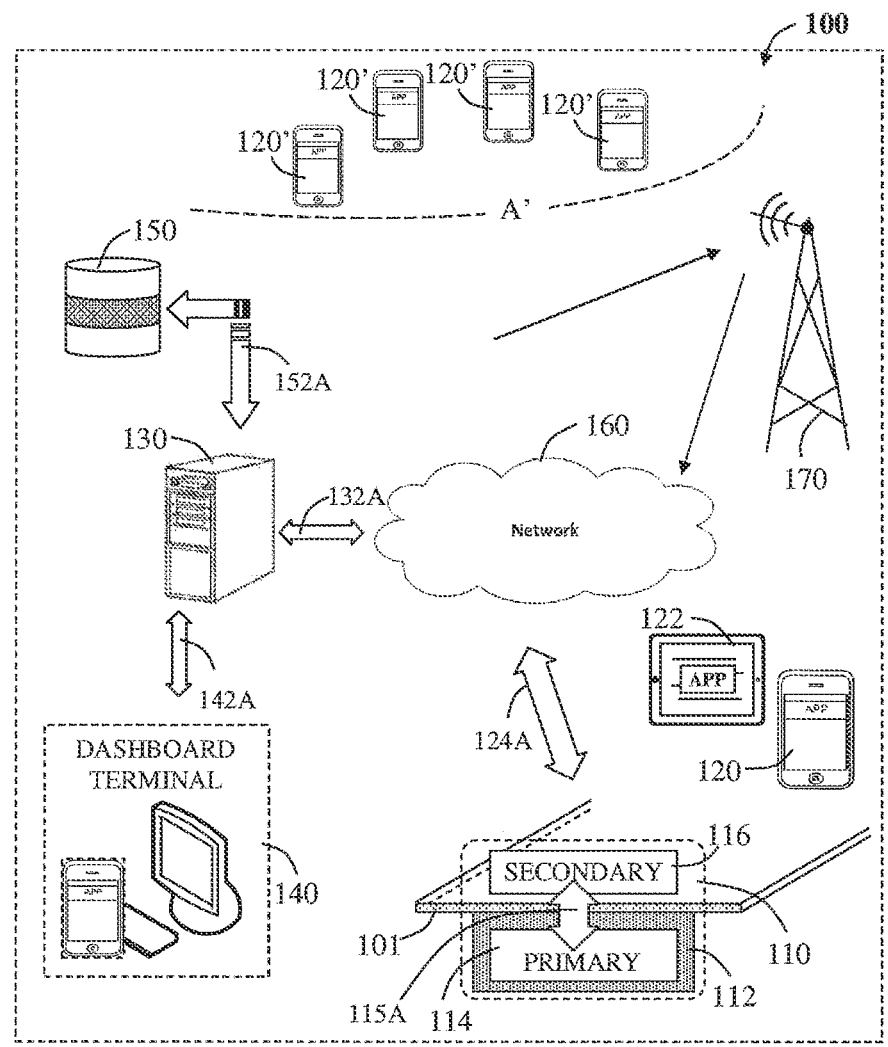
FIG. 1 is a schematic representation of selected elements of a distributed system for powering electrical devices via wireless power outlets and receivers.

Aspects of the present invention relate to providing systems and methods for managing a wireless power transfer network for electrical devices. A centrally managed system, using a cloud based management console, in communication with a management server may execute power management software of the current disclosure. The power management software provides a platform, centrally covering power management aspects of a network of wireless power transfer outlets distributed in public spaces. The power management software may provide a manager of a venue with the ability to manage the wireless power outlets (hotspots) that are installed therein. Optionally, the same management software system, with higher system administration rights, may allow power management of several venues or manage the whole organizational power transfer outlet network. The power management software is operable to provide remote control and monitoring, maintenance of wireless power outlets coupled with system remote health checking, enable provisioning functionality, maintaining security and business goals using policy enforcement technique.

The wireless power outlet network management system may provide a set of functionalities such as network outlet discovery identifying the outlet units present on a network or a venue, availability and uptime, Network outlet monitoring to determine the health of outlet network components, mapping of network elements, maintenance and event management, performance and usage data collector, management data browser and intelligent notifications allowing configurable alerts that will respond to specific outlet network scenarios.

Accordingly, management server collection of data usage may contribute valuable statistics accessible to end users, partners, service providers, venue owners and the like.

Optionally, policies may be based upon historical usage analysis of a specific wireless power outlet, specific user or a specific group of users.

The power management and maintenance software may include operational aspects such as remote stop/start, remote restart, remote software upgrades and updates. Optionally, the remote maintenance functionality may include remote user indication control testing (LED, sound).

The power management software may enable remote health checks by performing a testing procedure of the software or hardware quality of the remote wireless outlet, or verifying the remote wireless power outlet is active by testing response to a communication signal. Optionally, the health procedure may test for "health" parameters, such as temperature, power consumption, connectivity status, current and the like. Further, the testing procedure may be a scheduled process or carried out on demand Where appropriate, an indication alert may be triggered.

The power management software may enforce policies for command and control, these may include operational aspects such as power management policies to define who, when and where can charge and for how long, policies to define the type of service (current), policies to define type of device, dynamic policies optionally selected from a group consisting of real time management of power consumption, real time management of battery health, location traffic control in venue (send users to venues based on real time parameters values).

The power management software may include operational aspects of providing power transfer or control billing aspect associated with an electrical device. Thus, the power management software may be operable to provide features such as aborting power provision of a power transfer outlet, continue providing power, modifying the service or controlling one or more aspects of the power transfer procedure by enforcing a new policy, for example, or the like, possibly according to operating signals received. The power management software may further be operable to handle user accounts, registration of devices, user specific information, billing information, user credits and the like.

It is noted the management software may further be operable to detect undesirable conditions while coupling health checking functionality and remote maintenance. For example, events such as adding or removing a wireless power outlet in a venue, may be detected.

Optionally, the system may be configured that when a new wireless power outlet is detected, the system automatically responds in installing an appropriate policy.

Additionally or alternatively, the system may configured to transmit an alert the system administrator with an appropriate message.

The Management Console:

The system provides a management console communicating with the management server software application layer that may provide a manager of a premises with the ability to manage the hotspots that are installed therein, directly or via the venue gateways. Optionally, a manager with higher administrative rights may control a larger portion of the organizational network of wireless power transfer. The management console may be accessed through a web browser or an application on a computer, laptop, tablet and the like.

The management console may allow a manager to perform various tasks of managing the power provisioning process, remote maintenance, system health check, system monitoring, policies management and the like. A manager, for example, may be capable of viewing real time on/off status of hotspots; remote software updating or restarting a wireless power outlet, viewing usage statistics and generate reports per user/location/hotspot/time; create, edit, and assign usage policies per location/day-of-week/time/user.

The system may provide three levels of access and administration: Administrator, MAdmin and MUser, for example.

Administrator-level managers may have administrative rights to access all the information and the settings in the system.

MAdmin-level managers have access to the general settings for all the locations of a specific premises or group of premises. The MAdmin can create/delete/edit MAdmin and MUser accounts and assign rights to them.

MUser-level managers may have rights to one or more locations, for which he can view statuses, manage specific policies and get reports.

It is noted that further administrative rights associated with additional system administrators may be configured to answer various venue needs, providing read only, read/write access, for example, as required.

In certain embodiments, the system may have a flat hierarchy of the MUsers, where MUsers cannot be defined as managers of other MUsers, and there is no inheritance of rights from one user to another in a hierarchical way. Alternatively, the MUsers may be arranged in hierarchical structures Each customer may start with one MAdmin account, which may then create other MAdmin and MUser accounts. When an Admin account is created, the following may be set: company, type of admin, full name, phone, email, rights to manage a certain list of locations, and the like.

All the activities that MAdmins and MUsers perform in the system may be logged in a system log (date/time, user, type of activity, details).

Figure 5A:
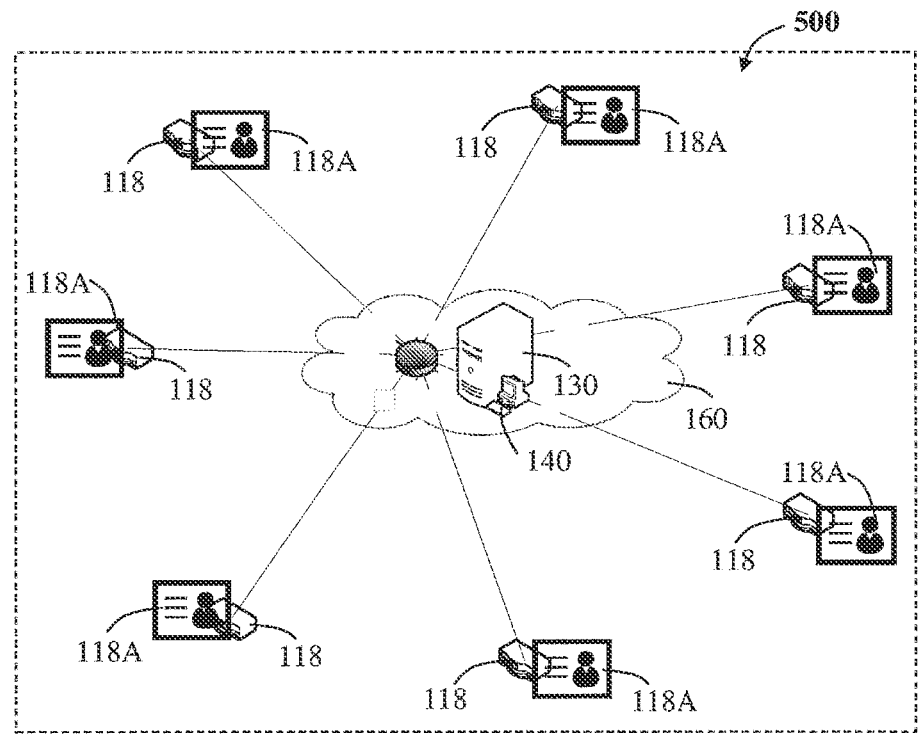
FIG. 5A is a schematic representation of possible power transfer network view, accessible on a management console, enabling to select a venue gateway for further actions.
Figure 5B:
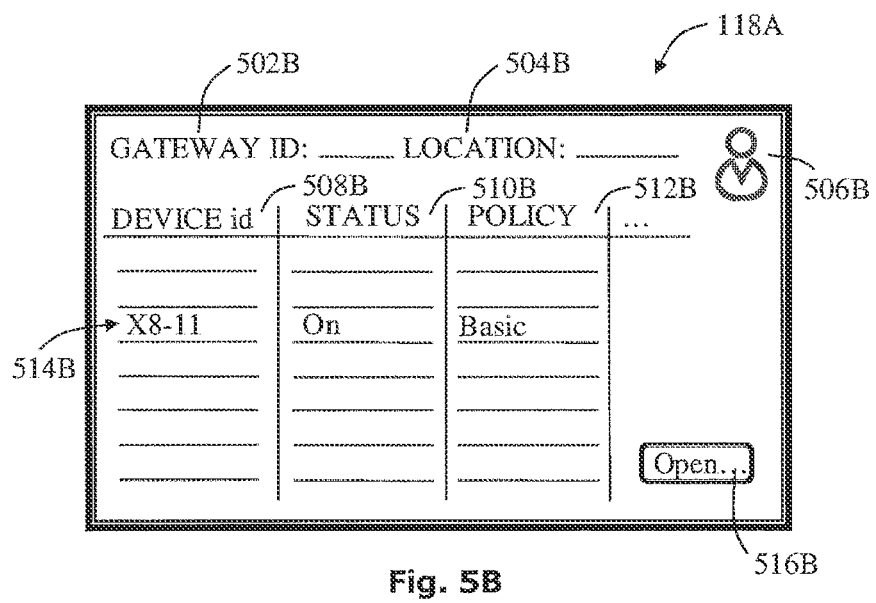
FIG. 5B is a schematic representation of a possible venue gateway summary view and listing of the associated wireless power outlets under, accessible on a management console.
Figure 5C:
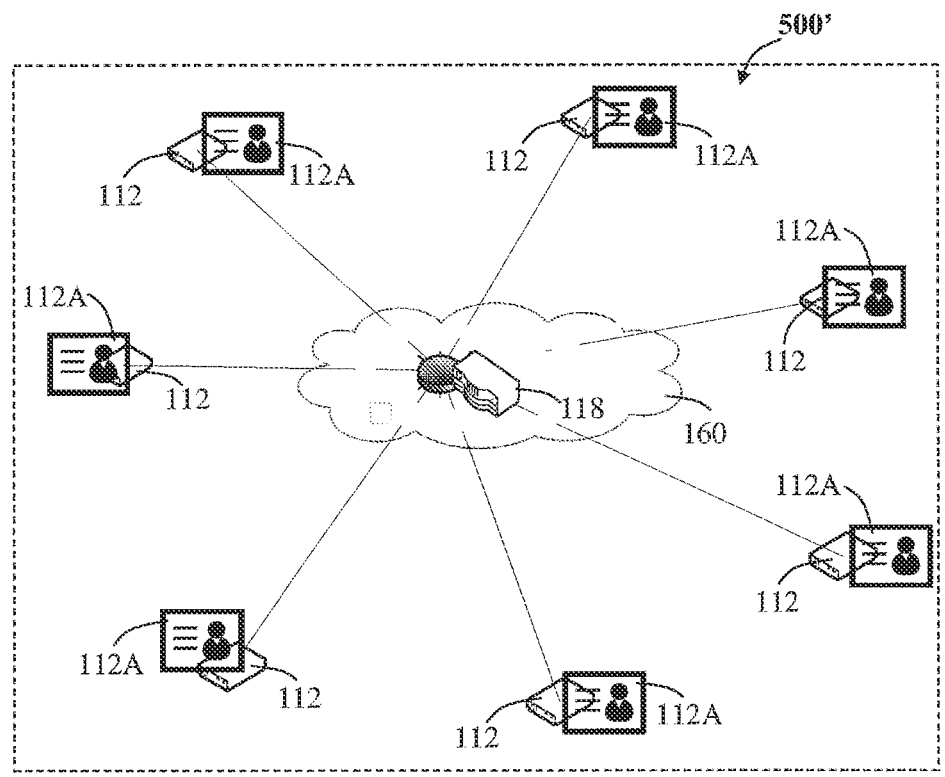

The management console may allow a MAdmin or MUser to view a schematic diagram of the location of the Hotspots in a venue such as described in FIG. 5C. The diagram may denote the status of the Hotspots with color or pattern indications. The status may include On, Off, Note-Used-Recently, faulty, and the like. The management console may also be operable to display usage statistics per user/Hotspot/time, in the form of, e.g., graphs on screed, formatted printable report, exportable CSV format and the like. Other possible reports include, e.g., charging patterns over time, list of Hotspots used and number of usages per each over time, list of locations with user charged and/or number in visits over time, statistics of usage of each type of user plan. For the graphs the time scale may have a slider that enables adjustment of the time scale—from data points every 1 minute to data points every one week. It is possible to have a non-continuous scale, e.g. 1 minutes—15 minutes—1 hour—4 hours—1 day—1 week.

A MUser may set policies for the 'Store promotion' layer of service: Add free charging minutes on top of $T_{free}$, based on criteria. A user/user group that qualify may be allowed to charge their device for free, variously, for: a specified number of minutes; at specified locations; during specified days of the week; at specified time slots. A policy may have a validity duration, e.g., valid between Date1 and date2, where date1<=date2 and date2 can be equal to 'no expiration'.

An administrator of the server may have the access to perform one or more of the following actions in the system:

The Administrator (Admin) may be able to do everything that a MUser can do, and may have rights to all customer accounts and all locations.

The Admin may be able to overrule a policy for a specific device (by RxID) by overriding the base policies for that device. Such devices may be used at installation or at maintenance times to validate the proper operation of a Hotspot. The policy override may be time limited and may revert back to previous default policy when the time is up. The Admin may have access to devices that are designated with 'always on' or 'never on' policies, which may be referred to as "Golden Receivers".

The administrator may have visibility into the wellbeing of the installed components, e.g., alerts for gateways that did not communicate with the server over a specified period of time, alerts for Hotspots that did not communicate with the server over a specified period of time, and the like.

It is noted that a power provisioning software application may be installed on a mobile device and may be operable for receiving data pertaining to a wireless power transfer network of a mobile device.

Further, the power provisioning software application may be operable to be executed on a mobile device enabling to manage power requirements within a wireless power transfer network. The power transfer network system, may use a deployment of at least one wireless power outlet (in the public space) controlled via a management console and operable to manage wireless power transfer with the power receiver of a mobile device, at least one management server in communication with the at least one wireless power outlet, and a database in communication with the management server and operable to store data received by the management server from the at least one wireless power transfer outlet.

Where appropriate, the wireless power transfer system may allow wireless power transfer to electrical devices of users such as mobile devices, smartphones, tablet computers, laptops and the like, at home, office and various public areas, and may be centrally monitored and controlled.

It is noted that the wireless power outlet may be operable to execute a software module with near communication features to communicate with the electrical mobile device, perform identification to verify user credentials and allowances, and further communicate with the management server. The management server may be operable to receive communication requests from the wireless power outlet comprising at least one data package to enable gathering of detailed user or device usage information, power status information and store the data in a database. The gathered data may include location and geographical information, user and device ID and other possible identification data, battery level information and the like.

As used herein, the term "virtual session" or "session" may refer to a hosted session of a virtual computing environment associated with a particular user that may be accessed from one or more client devices other than the host. For example, a session may include a thin client session, a virtual application session, a virtual machine session, a virtual operating system session, and/or the like. As used herein, a session described as being "between" a host device and a terminal device refers to the exchange of data between the host device and the terminal device, where the data is related to the session hosted at the host device.

As used herein, the term "terminal device" refers to a device configured to provide a user interface for a remotely hosted virtual session to a user associated with the virtual session.

As used herein, the term "management server" refers to a server configured to manage multiple inductive power outlets configured to provide power transfer to electrical mobile electrical devices, and controlling the power charging between an electrical mobile device and an associated wireless power outlet. The term "management server" may be referred to herein as, variously, as a "control server", "central server" or a "server".

As used herein, the mobile electrical device may be referred to herein as, variously, a "user device", an "electrical device", an "electronic device", a "mobile device", a "communication device" or a "device". The device may be an electrical device with a battery, e.g., a mobile handset, a media player, a tablet computer, a laptop/notebook/netbook/ultra-book, a PDA or the like. Alternatively, the device may be an accessory with a battery, such as earphones and the like, or a stand-alone battery. As a further alternatively, the device may be any powered device, including electrical devices without a battery.

The wireless power outlet point may be referred to herein as, variously, a "PAP", a "hotspot" or a "charger".

As used herein, the term "memory" or "memory unit" may represent one or more devices for storing data, including read-only memory (ROM), random access memory (RAM), magnetic RAM, core memory, magnetic disk storage mediums, optical storage mediums, flash memory devices or other computer-readable mediums for storing information. The term "computer-readable medium" includes, but is not limited to, portable or fixed storage devices, optical storage devices, wireless channels, a "SIM" card, other smart cards, and various other mediums capable of storing, containing or carrying instructions or data For the purpose of clarity in description, the following description describes systems, devices, methods, and software for dynamically updating a session based on data received from an access card reader. However, it should be understood that the same principles may be applied to the receipt of authentication data from any type of peripheral or standalone access or authentication device, including access card readers, smart card readers, biometric data readers, keypads, buttons, near field communications (NFC) devices, and the like.

Management Server Functionality:

The management server may be capable of integration with external servers or services. Some integration may be for data enhancements and external validation of rights for users or devices, and others may be for managing a certain functional aspect of the system, such as: network management and monitoring, maintenance of remote units, policy enforcement, user management, device management, billing, advertising, socializing and the like.

Various functionalities may be available through the power management software, and may also be available to third-party applications through application programming interfaces (APIs) for the server or another client application. Without limiting the scope of the application, selected functionalities may include, amongst others:

Using satellite positioning, antenna triangulation, wireless network locations or in-door positioning location information to display a map with nearby public hotspots.

Booking a Hotspot in advance, and accordingly, the booked Hotspot will not charge for other users, only for the registered user when he arrives, and identified by the unique RxID.

Registering devices.

Checking power transfer statistics.

Buying accessories, charging policies.

Checking real-time power transfer balances for registered devices.

Setting notification methods, receiving notifications.

Setting an automatic check-in to the Hotspot location.

Setting automatic interactions with social networks, e.g. automatic check-ins, tweets, status updates, and the like.

Providing store-specific promotion updates via push notifications, for example, based on past and current usage of power transfer services and user's micro-location.

Using accumulated information of the usage of the wire transfer service, including locations and the like, to better target users with promotions/ads.

Creating loyalty plans for venues based on usage of the wire transfer services in their premises.

Providing services to users based on information that their social-network connections are/were at a close proximity.

Launching a third party application on a user's device based on past or current usage of power transfer services and user's micro-location.

Collecting statistical information associated with usage of the application

It is noted that if communication with the server cannot be established, the application may allow the providing of power transfer based on a predefined "offline policy".

System Architecture:

Some embodiments representing the current system architecture may use Client/Server technology, but are not limited and may use other network architectures such as a peer-to-peer architecture, where each node has equivalent responsibilities.

In software engineering, Client/Server architecture refers to a network architecture where each computer, device or process on the network is either a client or a server. Such network architecture are applicable to enterprise applications, and generally the presentation, application processing, and data management functions are logically separated and operable on various nodes (tiers) of the system.

The client software (may be referred to as the user agent) allows the interaction between the client machine (a dashboard terminal, a workstation, a dedicated wireless power outlet or an electrical mobile device) and the application layer. When web-based applications are used, the client node (usually a browser) renders the user interface, which may be generated by a presentation layer on the client side or the server side by interpreting the HTML, Java applets, or ActiveX controls, for example.

The presentation layer is software allowing the visualization functions for the application (on a dashboard terminal, electrical mobile device) and may comprise of static objects such as images, form fields receiving retrieved data from the database layer, or may use dynamically generated objects to allow populating the data appropriately, and displaying the result of the analysis or computation produced by the application layer. The output of the presentation layer may be submitted to a dashboard, and further formatted to be presented on a terminal dashboard, for example. On web-based applications, the presentation layer may be implemented by web servers.

The application layer provides the business logic of the distributed system of wireless power transfer network and the management software may be installed on a management server. The application layer may receive procedure invocations from the presentation layer, to which it returns the results of the application logic (computation or the analysis) performed on the management server. The application layer may further communicate with the database layer to store, update and retrieve data. The management database layer may store the application data, such as business logic and policies, third party business related information, user information, geographical locations, device IDs, power transfer duration and additional related information. The management database software may be installed on the management server or on a separate server (node). For any case, a database interface may be required in order to implement the business logic, allowing connecting to the database server(s) to retrieve, update and store data.

It is noted that in software engineering, such a complex client/server network architecture in which presentation, application processing, and data management functions are logically separated are referred to as a multi-tier architecture. The most widespread use of multi-tier architecture is the three-tier architecture, where the client may be the first tier (presentation layer), the management server is the second tier (application logic processing) and the database server is the third tier (data management).

Further, the interaction between the electrical mobile device and the wireless power outlet may fit under the technology of two tier Client/Server architecture, where the wireless power outlet acts may act as either the server or client as required. Additionally, the wireless power outlet, in a mode of transmitting data, serves as a client responding to application logic requests (from the management server).

Client-server architectures, in their simplest form, are sometimes called two-node (tier) architecture. Three-node (tier) architecture of a Client/Server system is typically composed of a presentation node, a business or data access node, and a data node.

Management and User Identification:

It is noted that data gathering of an wireless power transfer system deployment, distributed in various geographical locations may provide additional revenue channels to a business using advanced data analysis methods applicable to the gathered data, and may offer direct and indirect incentives to business and individual users related by adding to future purchase of goods, maintenance, deployment changes to answer demand and the like, by providing a data analysis layer of usage reports, statistics and trends, for example.

In order to enable this type of model, a simple and convenient method may be required for associating a user with a specific electrical mobile device and to a specific wireless power outlet (wired or wireless), based upon identification data, and possibly synchronized by a close handshake communication of the devices.

The current disclosure relates to a system for enabling this task to be accomplished automatically and with no user intervention. The system may utilize preexisting transmitters that may be common amongst many mobile electrical devices with additional software management applications to them. Such an implementation may allow for the mass deployment of the system with little or no additional cost or inconvenience to the user.

It is particularly noted that although described primarily in relation to inductive power chargers, the current disclosure may apply to any power providing schemes and are not limited to say wired or wireless charging schemes.

Optionally, the customer configuration management portal may use various screens to allow various functional manageability, such as: Wireless power outlet management, Venues management, Users' management, Policy management, Reports, Auditing for configuring and managing systems' events, Security management and the like.

Optionally, Wireless power outlet management may allow summary view of live status, and detailed view of a specific store to allow managing the store's hotspots and gateways.

Optionally, the Users' management may allow the new customer's admininstrator to create or delete a store, assign or deassign a store to a customer administrator (a system administrator functionality), assign or reassign stores to an operator, install a store (with gateways and hot spots), perform uninstall oprations of various components, enable or disable users of a customer, issue reports for all the venues and the like.

Optionally, the Reports may allow the following: display graphical representation and textual output files of a single device, a single store or multiple stores; each report may be adjusted to visualize data for a defined week/month/quarter within the last twelve months; the graphical reports may be viewed, printed, or saved to a file in a graphical format, or saved to file in a data format used to generate the report. As appropriate, the generated reports may provide usage per store of the total power transfer time in minutes, say, for a defined period, where store may be identfied by a store ID; charging hotspot utilization for a 24 hour cycle, say, providng the average daily time, in minutes say, per a hotspot per a store; usage per date and trend, providing total power transfer time, in minutes say, per date for all stores, with a linear trend line and possibly, define weekdays and/or weekends in the display; sessions, providing distribution of lengths of sessions and average session length; charging per time of day providing total charging minutes for all stores per hour of day for the defined period; repeat usage, providing rate of returning users and number of repeat visits for power transfer; and device type providing distribution per type of device.

Optionally, auditing may allow the following: create log data for every important event in the system, including: installation or removal of a gateway, installation or removal of a hotspot, rejecting a hotspot as a not "legitimate" hot spot (not in production database), definition or cancelation of a user, customer or store, creation of SN generator file and others.

Optionally, Policy management may allow the following: creating basic policy for power transfer per each day of the week, weekend specific power transfer policy, time slot resolution per a hotspot (or all hotspot in a store) such as a hotspot is active between 8 am-1 pm and 4 pm-7 pm, for example. Further, a policy may be executed at once on all hotspots per store, such as disabling all hotspots or enabling all. Optionally, when an hotspot is confgiured as 'not available' per policy, its status may be indicated a the LED color, red say, for 'unavailable'.

It is noted that hotspots availability may be greater than the advertised time.

Description of the Embodiments

It is noted that the systems and methods of the invention described herein may not be limited in its application to the details of construction and the arrangement of the components or methods set forth in the description or illustrated in the drawings and examples. The systems, methods of the invention may be capable of other embodiments or of being practiced or carried out in various ways.

Alternative methods and materials similar or equivalent to those described herein may be used in practice or testing of embodiments of the invention. Nevertheless, particular methods and materials are described herein for illustrative purposes only. The materials, methods, and examples are not intended to be necessarily limiting.

Accordingly, various embodiments may omit, substitute, or add various procedures or components as appropriate. For instance, it should be appreciated that the methods may be performed in an order different than described, and that various steps may be added, omitted or combined. Also, aspects and components described with respect to certain embodiments may be combined in various other embodiments. It should also be appreciated that the systems, methods, devices, and software may individually or collectively be components of a larger system, wherein other procedures may take precedence over or otherwise modify their application.

Figure 2:
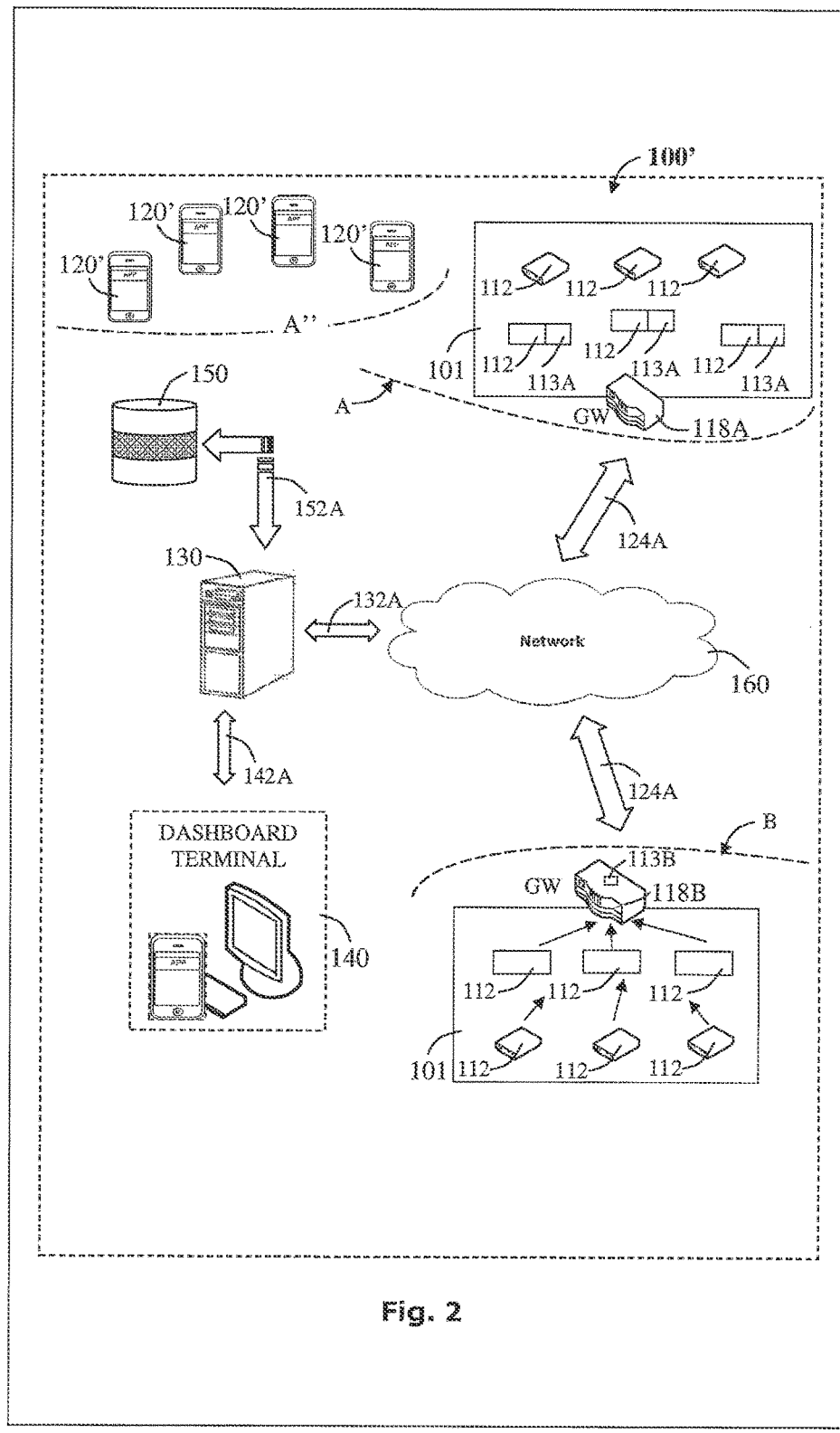
FIG. 2 is a schematic representation of selected elements of a distributed wireless power transfer network for powering electric devices via local gateways.

Reference is now made to FIG. 1 and FIG. 2 schematically representing a distributed system 100 and 100' for providing power transfer for mobile devices, with at least one location for servicing power transfer requirements and searchable using the power management software application. According to the current disclosure, the distributed system 100 of FIG. 1 provides external network connectivity and internet access by each wireless power outlet 112, while the distributed system 100' of FIG. 2 provides the external network connectivity for each wireless power outlet 112 via the local venue gateway(s) 118.

It is noted that the power management software provides functionality of device power storage management combining the status of the power storage unit of the electric mobile device, user preferences and current location to offer various power related recommendations and directing the user to the nearest power transfer location, accesible according to the potential locations of servicing wireless power transfer.

FIG. 1 schematically represents a distributed wireless power management 100 for external network connectivity and internet access for each wireless power outlet 112, providing wireless power transfer technology and at least one location for wireless power transfer for electrical devices, searchable by the power management software application, according to the current disclosure. The distributed system 100 comprises a wireless power transfer component 110, a management server 130, a management database 150, a communication network 160 and a mobile communication network 170. The section noted 'A-A' of FIG. 1, represents the public space of users, using mobile devices 120' installed with a power management software application.

Optionally, the distributed wireless power management system 100 comprises a dashboard terminal 140.

Optionally or additionally, the users within the public space noted 'A-A', each using an electrical mobile device 120' connectable via the social network, enabling to share data and information with other member of the social community.

The wireless power transfer component 110 comprises two sub-components, the wireless power outlet 112, optionally embedded into a surface 101, comprises a primary inductor 114 and connectable to power supply (not shown) and an electrical mobile device, such as a smartphone 120 or tablet 122, each comprising a secondary inductor 116 connected to a load and capable of coupling with the primary inductor 114 to allow wireless power transfer to the electrical mobile device. The wireless power outlet 112 may, alternatively, be referred to as a hotspot (HS) and may further include a LED display operable to display on/off/dimmer/fade-in-out signals.

It is noted that the electrical mobile device 120, 122 may each have a unique identifier, which may be referred to as a receiver identification (RxID). The electrical mobile device 120, 122 may be identified by a wireless power outlet 112 when the electrical device 120, 122 and the wireless power outlet 112 are in close proximity The wireless power outlet 112 may have a unique identifier, which may be referred to as a transmitter identification (TxID).

It is further noted, that communication between the wireless power outlet 112 and the electrical device 120, 122 may use the communication channel 115A to communicate between one another, and optionally establish credential exchange to allow power transfer.

The wireless power outlet 112 may communicate with the communication network 160 via the communication channel 124A, allowing internet-based communication and further communicating with the management server 130 through communication channel 132A, which in turn may use communication channel 152A to communicate with the management database 150, whether the management server and the management database are installed on the same machine, or separately.

Optionally, the wireless power outlet 112 may communicate externally using cellular communication infrastructure 170.

The communication process between the wireless power outlet 112 and the management server 130, may be operable to perform sending of various periodic status and non-periodic events. The various events may include TxID, RxID identification parameters and additional information such as starting power transfer, stopping power transfer, modifying service in some way, receiving server permission commands, on/off commands for aborting power transfer or resuming, charging balance status and the like.

The terminal dashboard 140 (optionally other types of clients, such as electrical mobile devices and the like) may use the communication channel 142A to communicate with the application layer of the management server 130.

It is noted that the wireless power outlet 112 may communicate with the electrical mobile device 120, 122 exchanging identification information, and further send periodic status messages and non-periodic events to the management server 130. This type of communication, while using the wireless the power transfer provides exact indication of the current location of a user, if any other positioning system is not operable, to provide more accurate location bases recommendation combined with user preferences.

FIG. 2 schematically represents a distributed power transfer system 100' for providing wireless power transfer services to electrical mobile devices, communicating externally via a local venue gateway, according to the current disclosure. The distributed power transfer system 100' comprises two sets of wireless power outlets 112 located in area A and B, a local venue gateway 118, a management server 130, a management database 150, a communication network 160 and a mobile communication network 170. The section noted 'A-A' of FIG. 1, represents the public space of users, using mobile devices 120' installed with a power management software application.

Optionally, the distributed wireless power management system 100 comprises a dashboard terminal 140.

Optionally or additionally, the users within the public space noted 'A-A', each using an electrical mobile device 120' connectable via the social network, enabling to share data and information with other member of the social community.

The section noted 'A-A' of FIG. 2, may represent the public space of users, using mobile devices 120' installed with a power management software application.

Optionally, the distributed wireless power management system 100 comprises a dashboard terminal 140.

Optionally or additionally, the users within the public space noted 'A-A', each using an electrical mobile device 120' connectable via the social network, enabling to share data and information with other member of the social community.

Communication between the power modules 112 and the network management server 130 may be provided via communication modules 113. Variously, the communication module 113A, 113B may be incorporated into the power module 112 and may serve the host power module alone. Alternatively, the communication module 113B may be incorporated into the venue gateway 118B and may serve a plurality of connected power modules.

The wireless power outlet 112 may be capable of communicating with the local venue gateway 118A, 118B (collectively 118), wirelessly or using the venue Ethernet resources. The local venue gateway 118 has access to the communication network 160 through communication channel 124A, enabling the wireless power outlet 112 to send periodic status and non-periodic events and reporting the management server 130.

It is noted that area A and area B represent two different sets of wireless power outlets, where each wireless power outlet of in a set may communicate event notification messages via the local venue gateway 118, possibly according to setting configuration of the local venue gateway 118 or the setting of the wireless power outlet 112 itself. Optionally, the wireless power outlet 112 may be configured to function in dual mode, either through the local venue gateway 118 or communicate directly with the communication network 160, to provide improved online functioning. Thus, the wireless power outlet 112 of the distributed system 100' may differ from similar units of the system 100 of FIG. 1.

It is further noted areas A and B, may be separate rooms for example in the same venue, or may represent separate installations in different venues. Further, a single gateway 118 may manage a limited number of wireless power outlets, say six, and if the deployment requires more wireless power outlets, additional gateways may be a required.

Figure 3:
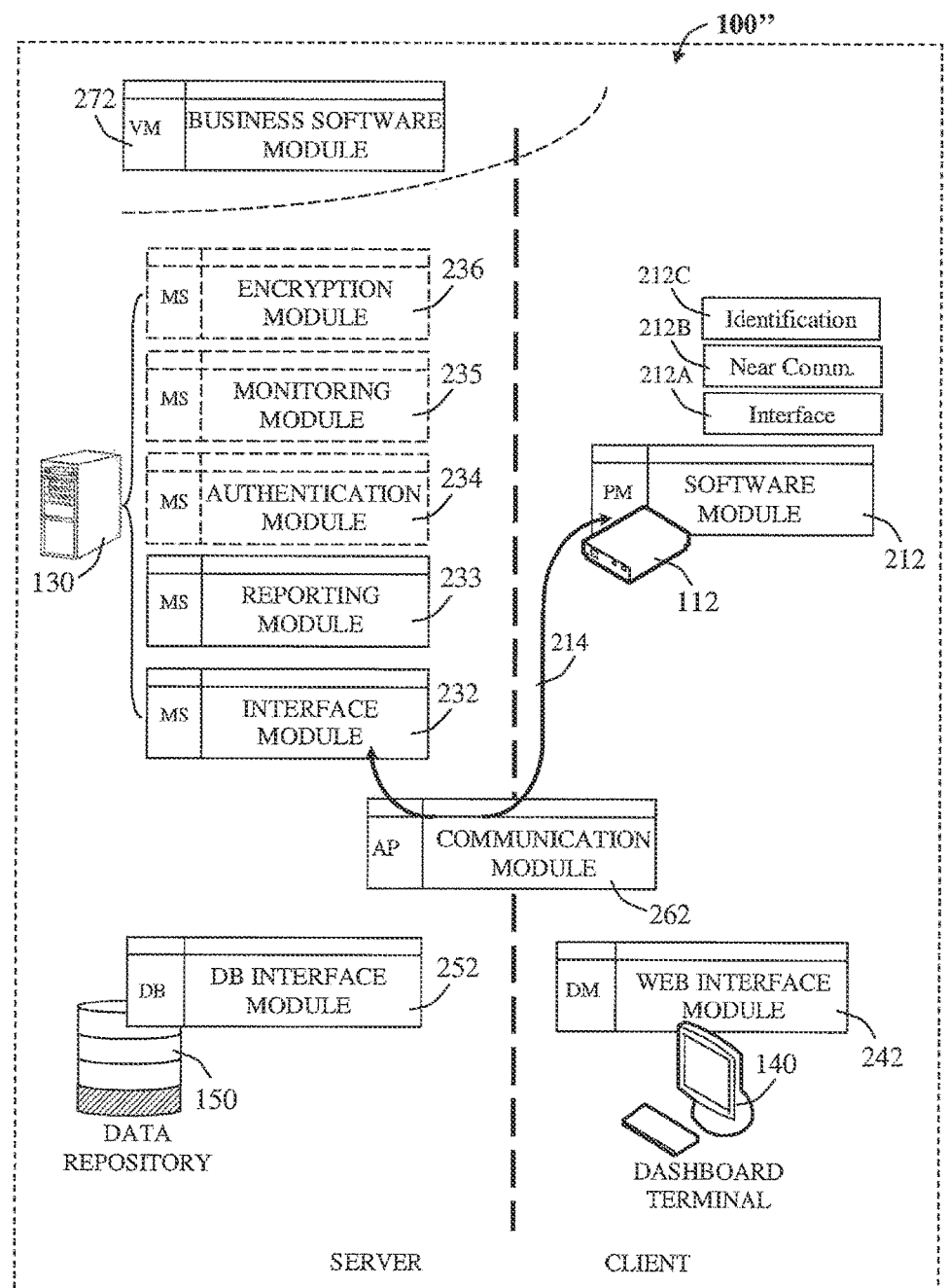
FIG. 3 is a block diagram representing a possible software module architecture for a distributed system providing wireless power transfer.

Reference is now made to the block diagram of FIG. 3, representing a possible software module architecture of a distributed wireless power transfer system 100".

The distributed wireless power transfer system 100" comprises a wireless power outlet 112, a management server 130, a data repository 150, and a communication network (not shown). Optionally, the distributed wireless power transfer system 100 comprises a dashboard terminal 140 and additionally, may comprise a business entity machine of a third party vendor (not shown).

It is noted that the electrical device and the related software application modules are removed, for clarity.

The wireless power outlet 112 may include a software module with sub-modules such as an interface 212A, a near communication module 212B and an Identification module 212C.Communication with the management server, may use a communication channel 214 using internet connectivity or through a local business gateway (not shown).

The management server 130 may include the following modules: interface module 232, report generation module 233 and optionally an authentication module 234, a monitoring module 235 and an encryption module 236.

The data repository 150 comprises a database (DB) interface module 252. The DB interface module may be subdivided into several sub-modules, if the data repository is made up of several databases or additional secondary data sources exist.

Further, the communication module 262 allows communication to be established between the various components. The communication module may use various communication technologies to allow the communication between the various components, such as communication between the wireless power outlet unit and the electrical mobile device, communication between the wireless power outlet and the management server, and the communication between a dashboard terminal and the management server.

It is noted that the use of the term "communication module" does not imply that the components or functionality described or claimed as part of the communication module, as described hereinafter, in the communication module section, are all configured in a common package.

Optionally, if a business entity machine of a third party exists, it needs to be installed with a business software module 272, operable to interface with the management server 130, accordingly.

Optionally, if a dashboard terminal exists, it needs to be installed with an appropriate web-interface module 242, for example, to allow access and visualization of the distributed system.

The Communication Module:

The communication module reflects various aspects of the communication requirements between the components of the wireless power transfer distributed system, and may differ while answering different communication needs of the components. For example, the communication needs between the electrical mobile device and the wireless power outlet expose different functionality and technology in comparison to the communication needs between the wireless power outlet and the management server. Thus, when referring to the communication module, it is intended to clarify the various aspects and the communication technology that may be associated with specific interaction.

Communicating with the Management Server:

Optionally, the electrical mobile device may have a wireless LAN/WAN communication unit, which does not necessarily have to match the LAN/WAN transmission unit of the wireless power outlet. Furthermore, the electrical mobile device may include a near communication module capable of communicating with the module on the wireless power outlet.

The management or control server may be in communication with the wireless power outlet, the electrical mobile device, or both. The communication channel may be mediated by wireless access points, cellular networks (FIG. 1), wired networks or the like that may provide an internet protocol (IP) connection to at least one of the electrical devices or the wireless power outlet. It is further noted that optionally, the communication channel to the wireless power outlet may be mediated indirectly via the electrical device and the close communication module. Similarly, the communication channel to the electrical device may be mediated indirectly via the wireless power outlet.

Tx-Rx Communication:

Each electrical device may have a unique identifier, which may be referred to as a receiver identification (RxID), in the system that allows the recognition thereof. The RxID may be a MAC address. The management server may store user or electrical device related information in addition to the RxID, such as power transfer related data, billing information, user credits or the like.

Where appropriate, wireless power outlets may have a unique identifier, which may be referred to as a transmitter identification (TxID), in the system that allows the recognition thereof.

For illustrative purposes only, possible methods for providing access to power for electrical devices in public spaces are presented hereinafter. The method may allow a user to transfer power or charge an electrical device such as a mobile phone, a tablet or the like from a wireless power outlet and may further allow a power provider to manage the power transfer, while gathering power transfer related information.

A user may place or connect an electrical device to a wireless power outlet. For example an inductively enabled device may be placed upon a wireless power outlet. Alternatively, or additionally, a power supply may be conductively connected to an electrical device.

The power access point may detect the electrical device connection. For example, wired connection may be detected by detecting the load and wireless connection may be detected using various remote sensors such as hall sensors, analog ping schemes or the like.

Initial Authentication/Handshake:

The wireless power outlet may enable power transfer for a predefined time $T_{free}$ during which time period user credentials may be authenticated.

Optionally, the wireless power outlet may transmit a random pattern to the device via the close communication. The wireless power outlet may further transmit that same pattern to a control server via a WAN/LAN connection.

For example, a software application running on the electrical device may be operable to receive the pattern and to relay the same pattern to the management server along with user identification token.

Variously, the management server and electrical device may exchange multiple messages to complete authentication of the user.

Optionally, the wireless power outlet may initiate a registration process upon first-time interaction with the management server to determine initial setup, providing credentials to allow accessing the management server. It is also noted that the first-time authentication may be used for the agreement of the management server to manage the outlet Tx and agreement with regard to the identification of each side, the identity of the outlet Tx and the identity of the management server, for any further communications.

The management server may thereby be able to associate the specific wireless power outlet with the specific electrical device. If the user is deemed permitted to use the service the management server may send a confirmation signal allowing the wireless power outlet to continue servicing the electrical device. Where required, the confirmation signal may define a specific time period for which the service is granted or send a disconnect event on termination of that time.

Where appropriate, the management server may additionally or alternatively define multiple levels of service, for example, as expressed in terms of current provided to different users. By way of example, paying users may be enabled to access full powering capability, perhaps up to 20 watts or so, while non-paying users may be provided limited access to say 0.5 watts which may be sufficient to charge only low power devices or perform trickle charge for completely depleted batteries.

During operation the wireless power outlet may be operable to receive operating signals from the management server. According to the operating signals received, the wireless power outlet may be operable to perform various actions such as to continue providing power, to abort power transfer, to modify the service in some way or the like.

As noted herein, various methods may be implemented for enabling close communication between the electrical device and the wireless power outlet.

Audio Communication:

In one particular embodiment, the close communication channel between the device and power access point may be based upon audio signals sensed via a microphone of the electrical device, for example using specific audible bands, between 20 hertz and 20 kilohertz, or between 300 hertz and 20 kilohertz, say or the like. The audio signal may be emitted from an audio emitter such as a speaker or the like associated with the wireless power outlet. Many electrical devices, such as mobile phones and the like have microphone and software applications may have access to the microphone.

It is noted that powering the microphone unit may itself demand power. Consequently, the software application running on the electrical device may activate the microphone only where 'a-charge-connect' event is detected in the system. Accordingly, upon device detection the wireless power outlet may provide an initial power transfer to power the microphone. After a short interval, an identification signal may be sent via the audio signal.

The audio signal may include additional tones that are not related to the communication pattern which may mask the random patterns communicated. For example, an audio identification signal may be masked by a connection tone serving to provide users with an indication that a connection has been made.

Data-over-coil (DOC) Communication:

Alternatively or additionally, the close communication channel may be provided by the wireless power outlet alternating the activation of power transfer to the electrical device. The alternation of power supply is detected by most electrical devices as power transfer connection and disconnection events that are communicated to the application layer on these electrical devices.

The switching pattern may be coded with an identification signal such as the random pattern. The wireless power outlet may need to perform this switching in intervals spaced sufficiently apart to allow the electrical devices to detect and report to application level power transfer connection and disconnection events.

Bluetooth and NFC:

Still other embodiments may use Bluetooth or Near Field Communication (NFC) to achieve the close communication channel. These could be combined with the basic power signal to trigger their activation thereby conserving power.

In various embodiments of this system the LAN/WAN interface of the device may be WLAN or Cellular 2G/3G/4G connections. The connection to the WLAN or Cellular access point may also include manual or automatic insertion of user credentials. In this case the information may be conveyed to the management server to enable user identification. The information provided in order to allow access may also be stored by the device application and later provided directly to the management server.

Additionally, or alternately the LAN/WAN connection of the wireless power outlet may be achieved via the charged device. The wireless power outlet may encrypt messages to the management server and deliver this to the application on the electrical device via the close communication channel therebetween. The application may then send the message to the server via its LAN/WAN connection.

Database Interfacing:

The management server may provide an Application Program Interface (API) to allow the various component applications to access the management server, with further applicable access to data stored in the database(s). Accessing the database directly from the management server may use a command shell, which may come bundled with about every database selected.

The data may be stored in tables (relational database such as Oracle, Informix, Microsoft SQL Server, MySQL, NoSQL and more), objects (object oriented database) or documents/files (documented oriented database such as XML—Extensible Markup Language) and the like.

The database, installed on the same physical machine or separately, may be accessed through a common database interface such as Sequence Query Language (SQL).

Alternatively, the database may be accessed by an object oriented API, providing database-abstraction API to create, retrieve, update and delete objects, or use XML based API or the like.

It is noted that that each API may be implemented in various computer languages such as C, C++, C#, Java, JavaScript, Python and the like.

It is also noted that the interaction with the database may be transaction base, allowing to configure a set of commands For example, anything between the 'transaction start' and 'transaction commit' methods are not executed until 'transaction commit' is called, if no exception occurs. Rolling back the changes and cancelling operation may use a 'transaction rollback' method, returning the database to the original state if a problem occurs even though a number of changes may have executed to the database's tables.

The Encryption Module:

The Encryption Module may be responsible for encrypting instructions from the server to the wireless power outlet, and may further be delivered to the charged device which will relay them back to the wireless power outlet via the close communication channel.

Where applicable, the encryption may only allow the server and wireless power outlet to encrypt/decrypt the messages but would prevent the charged device from altering or creating a legal message. Accordingly, the transfer of the messages from server to wireless power outlet may require the existence of a bidirectional close communication channel. For audio signals this may be achieved by using the device speaker and including a microphone on the wireless power outlet.

Additionally or alternatively, a bidirectional power based signaling scheme may be achieved by modulating the load of the device on the wireless power outlet. As many devices do not allow applications to directly control the charging current used or the system load, it may be required to use some indirect techniques such as modulating screen illumination back light for LCD and direct pixel activation for OLED to vary the load.

It is further noted that wireless power transfer systems may offer additional options for close communication channels.

Figure 4:
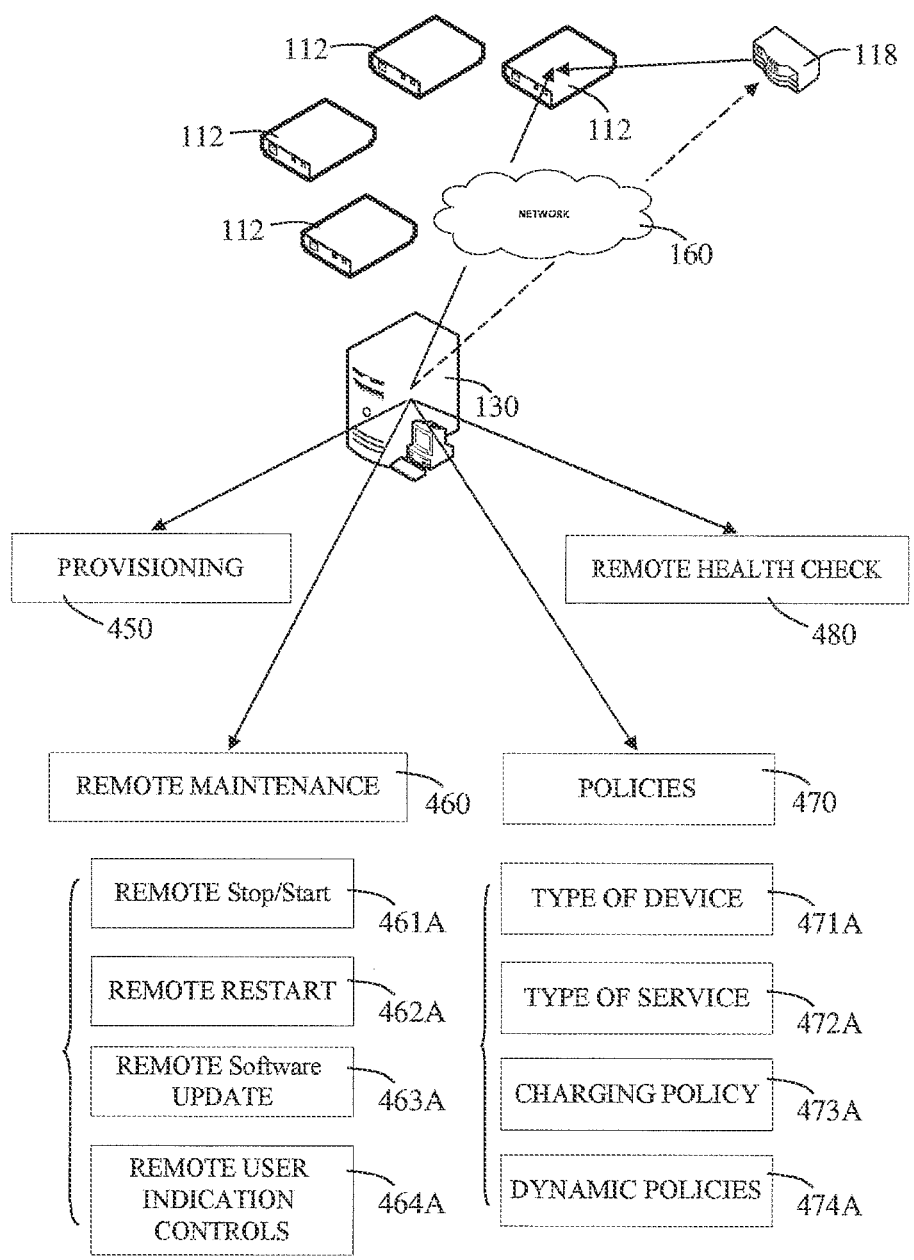
FIG. 4 is a block diagram representing selected actions of possible procedures covering aspects of the management functionality of a management server: health check, remote maintenance, provisioning and controlling power transfer by a policy(s)

Reference is now made to the block diagram of FIG. 4 representing selected actions of possible procedures for providing the administrator with the management functionality for monitoring and controlling a deployment of a wireless power outlet configuration in a venue. The possible management procedures may include provisioning 450 data, remote maintenance 460 policies management 470 and remote health check 480.

It is noted that the management server 130 may support direct interaction through the network 160 with each remote wireless power outlet 112 in a specific venue, or communicate with the venue gateway 118 to control each wireless power outlet 112. Although only one gateway 118 is described for illustrative purposes only, it will be appreciated that multiple gateways 118 may be controlled by a common management server 130.

The provisioning 450 procedure, may include communication with the provisioning software application of an electric device, to provide the provisioning policy for a user when in communication with a wireless power outlet in a location. The provisioning 450 procedure may further provide reporting functionalities, mapping of power transfer location according to electric device location and the like. The provisioning software application of an electric device may be used for paid power transfer, enabling to monitor and control power charging of the device.

The remote maintenance 460 procedure, may provide remote management of the wireless power outlet and may include remote stop/start 461A, remote restart 462A, remote software update 463A, and testing of remote user indication 464A such as a visual interface such as a LED indicator for example or an audio interface such as a speaker of other such sound generator.

The power management policies management unit 470, provides functionality of determining a set of policies of various aspects for controlling the wireless power outlet when interacting with a power receiver of an electric device. The power management policies management 470 procedure may generate various power management policies that may be appended into a single control policy. The policies management unit 470 may include type of device policy 471A, type of service policy, and a power transfer policy 473A. The policies management 470 may further include various dynamic policies 474A such as real time optimization of power consumption, real time optimization of battery health and may further control traffic at the venue site by communicating with members in the social space, for example, to add more traffic into the venue by suggesting to meet friends, advertising businesses in the vicinity with characteristics related to user preferences based on real time parameters and the like.

The remote health check 480 testing a remote wireless power outlet may be used to test accessibility and operability of the outlet unit and if the outlet is reachable across the network. Further, the process analyzes the connection's latency, determining the network speed, which may also be presented to the system administrator. Such a health check may be triggered on demand for a specific wireless power outlet in a specific venue, testing its status or may be triggered sequentially for all listed, potentially operable, wireless power outlets in a network when the network system is presented on the management server console, upon administrator communication request, providing various related parameters, including the status of the wireless power outlet itself.

Accordingly, the health check procedure 480 may transmit a control signal to the remote wireless power outlet, waiting to a response within a time limit.

It is noted that the provisioning procedure 450 may communicate with the wireless power outlet allow more accurate data for provisioning software applications, such as location. Information regarding the location of the Hotspot may be associated with the TxID of the wireless power outlet. Such location information may be programmed into the Hotspot at, e.g., the time of installation, and may provide very accurate location information, which may be more accurate than what may be provided through other methods, such as GPS or antenna triangulation. Where the power provisioning software is an application configured for a mobile device, the Hotspot may transmit information regarding itself (e.g., TxID, location, and the like) to the device, which then transfers the information to the application. The application may further identify the location using GPS, antenna triangulation, in-door positioning methods and the like. Such data, may be transmitted by the wireless power outlet to the provisioning layer of the management server.

It is further noted that the various policies and other business related matters of the policies management procedures 470, may be stored centrally in the database of the management server (130, FIG. 1), may include power transfer policies of the service supplier and/or provider, various policies, agreements or offerings of public business entities that may be relevant from end user perspective, and the like.

The outcome of the set of procedures may yield options enabling the administrator or the user various actions such as to get address and business hours, locate the public entity destination on a map, get driving directions, adjust search radius to reduce or expand number of possible options, filter by brand of the public entities, filter by ranking of social space members, number of Hotspot in a specific public entity, coupons and promotions, receiver accessories sales and the like.

Figure 5D:
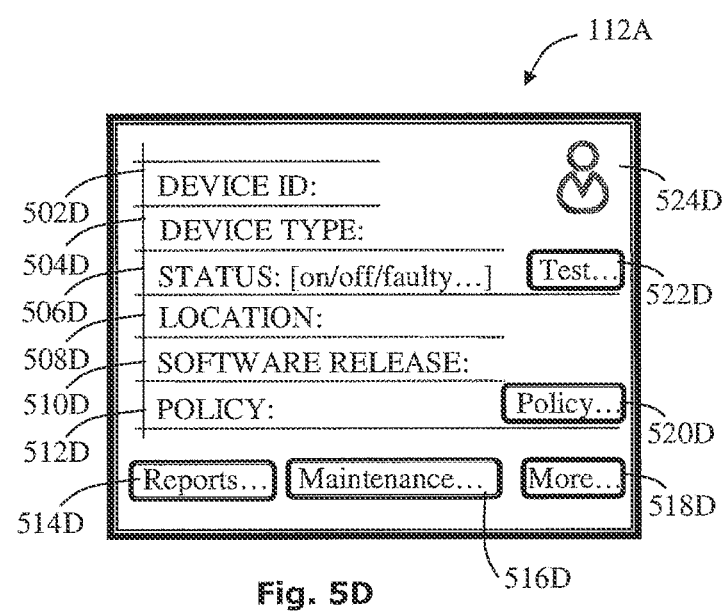
FIG. 5D is a schematic representation of a possible wireless power outlet details summary view, accessible on a management console and optionally displayed when the outlet is accessed.

Reference is now made to FIG. 5A-D, showing various schematic representations accessible on a management console, wherein FIGS. 5A and 5C are showing schematic representations of possible power transfer network views, of various architectures and FIGS. 5B and 5D show details display views of a selected device such as an icon representing a gateway 118 or an icon representing a wireless power outlet 112.

It is noted that throughout the description of FIGS. 5A-D, whenever an element is referred to within the scope of views accessible on a management console, such as a gateway, a wireless power outlet, a management server, for example, these terms refer to their icon representation.

It is noted that the power management software of the management server may provide functionality of outlets' power management in various aspects such as wireless power transfer and provisioning, remote maintenance, policy management, unit's health check and the like and also in various system architectures. The power management may further interact with a database, remotely, or incorporated in the same physical machine, to store related data and deliver the necessary functionality and services.

Accordingly, the configuration of FIG. 5C may display a view, accessible on a management console, representing system architecture whereby all wireless power outlets are centrally managed by at least one gateway in a specific venue. Such view may be accessible by selecting an icon representing a gateway 118 of FIG. 5A. Optionally, the configuration of FIG. 5C may display a stand-alone view representing system architecture whereby all wireless power outlets are centrally managed by at least one management server 130.

FIG. 5A schematically represents a distributed wireless power transfer network view 500, accessible on a management console, providing an overview of a deployment, optionally displayed on a management console, whereby a gateway is controlling several wireless power outlets in a specific venue. The distribution view 500 includes a central management 130, an associated dashboard terminal 140 (the management console), a communication network 160 to allow the management server to communicate and at least one venue gateway 118.

Such a distribution display, may allow the administrator to gain an overview of the whole network under his/her administration, optionally select other view to analyze various other aspects of the network by selecting a specific area of the display, selecting a gateway 118 and displaying its status and information in a popup window 118A, or further select a gateway 118, opening the sub-network of wireless power outlets controlled and monitored by that gateway. Viewing the sub-network of wireless power outlets may further allow actions of controlling and monitoring a specific outlet 112 of FIG. 5C.

It is noted that a specific venue may include one or more gateway devices 118, each controlling one or more wireless power outlets.

FIG. 5B is a schematic representation of a possible summary view 118A, accessible on a management console, of venue gateway 118 and its controlled wireless power outlets, accessible by selecting a venue gateway from the distribution view 500 of FIG. 5A and selecting an appropriate menu option such as open or display, to present the gateway detailed information. Optionally, this view may be accessible by double clicking the venue gateway icon representation to receive the detailed information in a popup window, for example. The summary view 118A, accessible on a management console, may include a gateway ID field 502B, a location field 504B, administrator related information 506B, a table of content with headers of Device id 508B, Status 510B, Policy 512B and more, where each specific row 514B of the table represents the related data of a specific wireless power outlet and an activation button Open 516B.

Optionally, clicking on the activation button open 516, when a line 514 is selected, may open a popup window to display a detailed information of the selected line 514 such as 112A of FIG. 5D, providing the details of the associated wireless power outlet 112 shown in FIG. 5C.

FIG. 5C schematically represents a partial distributed wireless power transfer network view 500' providing a possible overview of a venue deployment, accessible on a management console, whereby a single venue gateway is controlling all wireless power outlets in a specific venue. The venue distribution view 500' includes a venue gateway 118, a communication network 160, wired or possibly wireless, to allow the gateway to communicate and at least one wireless power outlet 112.

It is noted that a venue may have several wireless power outlets requiring more than a single gateway for controlling and monitoring the venue.

It is further noted that the network display 500' of a venue gateway, allows to perform various monitoring and control operations to a single selected wireless power outlet or may further allow multiple selections to provide common functionalities to selected outlets. Such operations, may allow to select an outlet to gain summary view of the device and further allow administrator operations as described hereinafter in FIG. 5D.

FIG. 5D is a schematic representation of a possible status and summary details view 112A of a wireless power outlet 112, optionally accessible on a management console by clicking the open action button 516 when an associated power outlet unit line 514 in FIG. 5C is selected, for example, to present the outlet detailed information. Optionally, this view may be accessible by double clicking the wireless power outlet 112 shown in FIG. 5C to receive the detailed information in a popup window. The summary view 112A may include a device ID field 502D, Device Type field 504D, Status field 506D, Location field 508D, Software Release field 510D and Policy field 512D. The display 112A further includes a 'Reports' action button 514D, 'Maintenance' action button 516D, 'More' action button 518D, a 'Policy' action button 520D, a 'Test' action button 522D and administrator related information 524D.

As appropriate the 'Reports' action button 514D may allow to generate a set of reports related to the wireless power outlet like usage over time, idle time, failure events, history of maintenance and the like.

As appropriate the 'Maintenance' action button 516D may allow maintenance operations such as restarting the selected wireless power outlet, install an updated software module or update current running policy and the like.

As appropriate the 'Policy' action button 520D may allow policy related operations, such as applying local configuration changes. Optionally, this policy tuning may be maintained via the maintenance action button 516D.

As appropriate the 'Test' action button 522D may allow to perform health checking tests for the remote selected wireless power outlet.

As appropriate the 'More' action button 518D may allow to access to additional action buttons, such as various administrator configuration options, users management, provisioning related activities and the like.

Figure 6A:
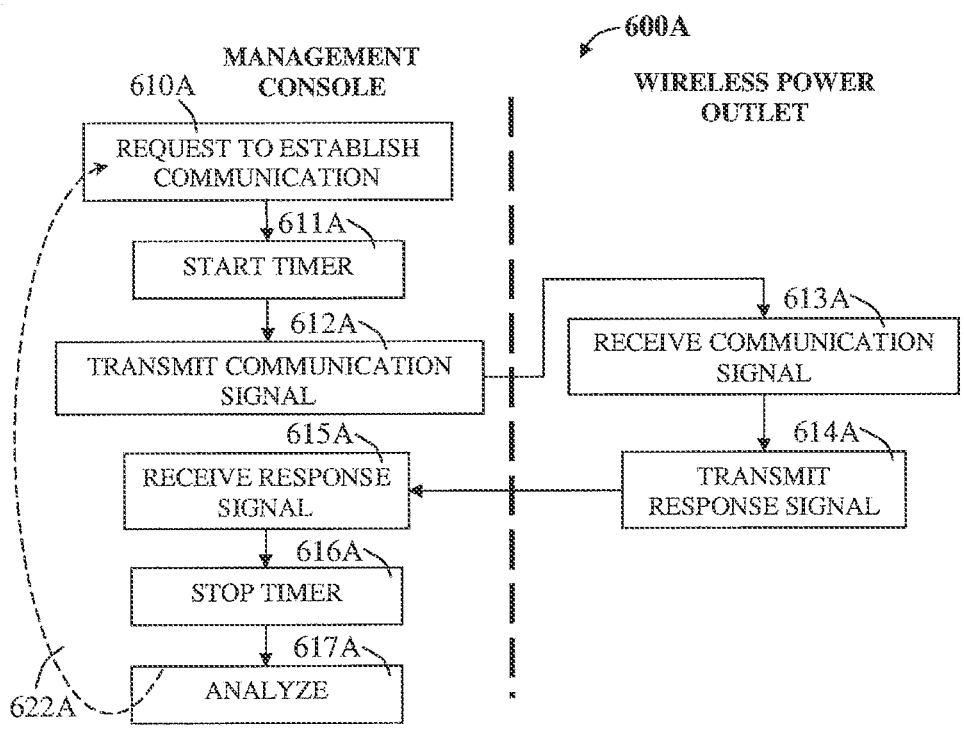
FIG. 6A is a flowchart representing selected actions of a possible method for processing a health check sequence of a wireless power outlet.

Reference is now made to the flowchart of FIG. 6A representing selected actions illustrating possible method 600A for performing a system's health check of a remote wireless power outlet in a network deployment. Such a health check may be triggered on demand for a specific wireless power outlet in a specific venue, testing its status or may be triggered sequentially for all listed, potentially operable, wireless power outlets in a network when the network system is presented on the management server console, upon administrator communication request, providing various related parameters, including the status of the wireless power outlet itself.

It is noted that the status of a wireless power outlet may change throughout its operation, upon a specific request such as restarting when software update is uploaded to the outlet unit or may be in a faulty status due to some malfunctioning of the outlet unit.

It is further noted that the network may allow control of power provision in public spaces such as restaurants, coffee shops, airport lounges, trains, buses, taxis, sports stadia, auditoria, theatres, cinemas or the like. Accordingly, the operability of each outlet unit in the network is required. Further, there is a need for such systems to enable tracking of individual wireless power outlet units, in order to provide a platform for efficient powering services boosted with remote monitoring coupled with maintenace functionality (remote restart, remote software updates and the like) to improve efficiency and availability.

The method 600A for a system health check, for example may include activities performed by the management server, automatically, if so configured, or may be triggered upon a specific administrator request. The wireless power outlet, is expected to respond to the communication request within a time limit to prove its satisfactory health status, reflecting an 'on' status. No response, implies a time-out situation and may result in presenting the wireless power outlet status as 'off'. If, for example, the response is slow, the status of the wireless power outlet may be referred to as 'faulty'.

It is noted that the health check of the remote wireless power outlet is used to determine verify if the remote outlet is reachable across the network. Further, the process analyzes the connection's latency, determining the network speed, which may also be presented to the system administrator.

The process starts with a request to establish communication 610A with the target wireless power outlet, followed with a timer start 611A to allow measuring response time; a communication signal is then transmitted to the remote selected wireless power outlet 612A; and the communication signal is received 613A and the wireless power outlet, then responds with a communication signal 614A; when the communication signal transmitted from the wireless power outlet is received on the management server, the timer is stopped 616A and the response time is analyzed 617A to allow indication of the current outlet unit status, for example, 'on', 'off', 'faulty' and the like. Where appropriate, the operation may be repeated as configured, say 4 times, to allow proper indication and may further repeat the cycle at a time interval or may be continuously repeated. The repeated manner or time interval of measuring may use default setting or may be configured by the system administrator.

It may be noted that the status indication on the network configuration of the management console may be enriched with additional text, color, blinking effects and the like.

It is further noted that technically, such a process may use a proprietary communication protocol, Internet Control Message Protocol (ICMP) or known communication tool such 'ping' and the like. As appropriate, 'ping' is a computer network tool used to test whether a particular host is reachable across an IP network.

Figure 6B:
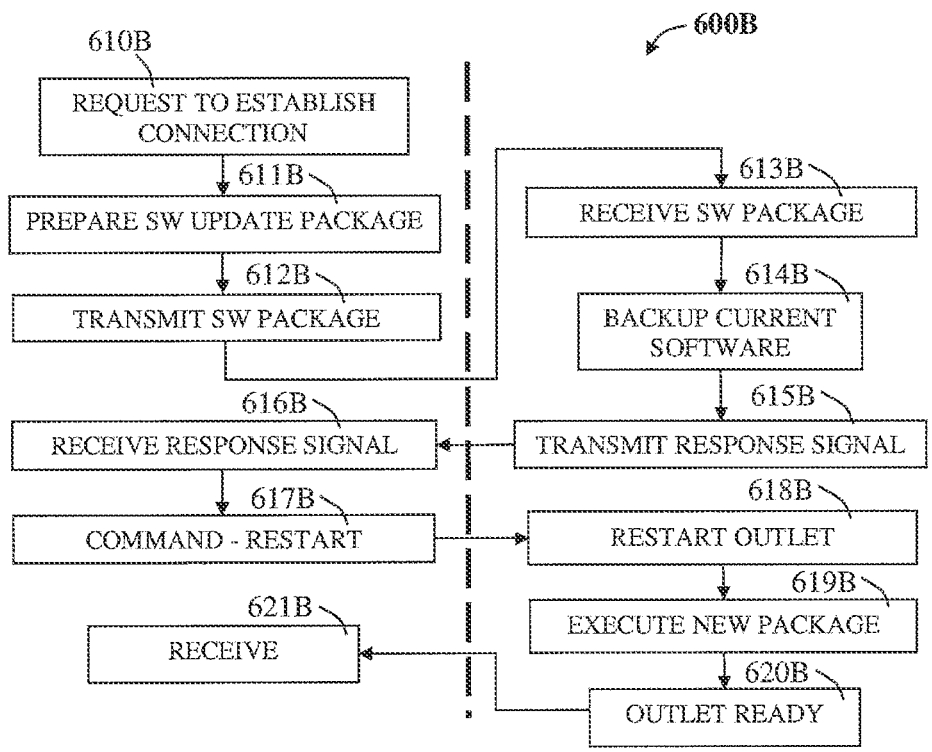
FIG. 6B is a flowchart representing selected actions of a possible method for processing a software update sequence of a wireless power outlet.

Reference is now made to the flowchart of FIG. 6B representing selected actions illustrating possible method 600B for performing a system software update to a remote wireless power outlet in a network deployment. Such a software update may be triggered on demand for a specific wireless power outlet in a specific venue, for fixing an outlet unit problem, for example, or may be triggered sequentially for all listed and operable wireless power outlets in a venue or network by a system administrator. Optionally, after software update of a wireless power outlet, the device needs to be restarted in order to shut down the previous version and execute the new update. Where appropriate, the previous software version may be stored on the wireless power outlet storage unit, for a backup, providing restore functionality.

It is noted that the installing a software update may be required to fix a known fault or may be necessary to make use of new software features.

It is further noted that there is a need for such system to enable tracking of individual wireless power outlet units, in order to provide a platform for efficient powering services boosted with remote monitoring coupled with maintenace functionality (remote restart, remote software updates and the like) to improve efficiency and availability.

The method 600B of system's software update includes activities performed by the management server. These actions may be triggered automatically if so configured, alternatively or additionally the actions may be triggered upon a specific administrator request for a single unit, or install a set of software updates following multiple selections. Optionally, the wireless power outlet may need to restart after storing the software update package, and execute the package after restart depending of the nature of the software update. Such an option may be configured specifically for each software update.

The process may start with a request to establish communication 610B with the target wireless power outlet, followed by a step of preparing the software update package 611B and then the software package is transmitted 612B to the remote outlet unit; the software package is received on the remote outlet unit 613B, optionally stored on its storage unit; and creating a backup copy of the current software package 614B; followed with transmission of a response signal 615B to the management server, indicating current status; upon receive of the transmission response from the remote outlet unit 615B, the management server continues with a restart command transmitted to the remote outlet unit 617B; resulting with a restart of the device 618B. Accordingly, when the outlet unit restarts, the new software package may be executed to complete the installation process 619B; upon completion, the outlet unit may send an indication message to the management server 620B, notifying that the new version of the software for the specific outlet unit is updated. This communication is then received by the management console 621B.

It may be noted that the various outlet units may own different software versions, depending on the device type and its operability.

It is also noted that updating an existing power management policy installed on a wireless power outlet may perform similar steps, as described hereinafter in FIG. 7B, when installing a new power management policy on a remote outlet unit, storing the new policy in a temporary location, restarting the outlet unit and, activating the new power management policy to become the active control policy.

It is further noted, that having an update policy installed on the remote wireless power outlet is essential for answering business matters.

Network API:

The deployment of wireless power transfer infrastructure may enable the provision of convenient access to wireless power transfer in public venues. Accordingly, a smart, manageable, global wireless power transfer network is disclosed which may allow a wider deployment of wireless power provision for mainstream technology and possible standardization of a network architecture and associated APIs.

Figure 7A:
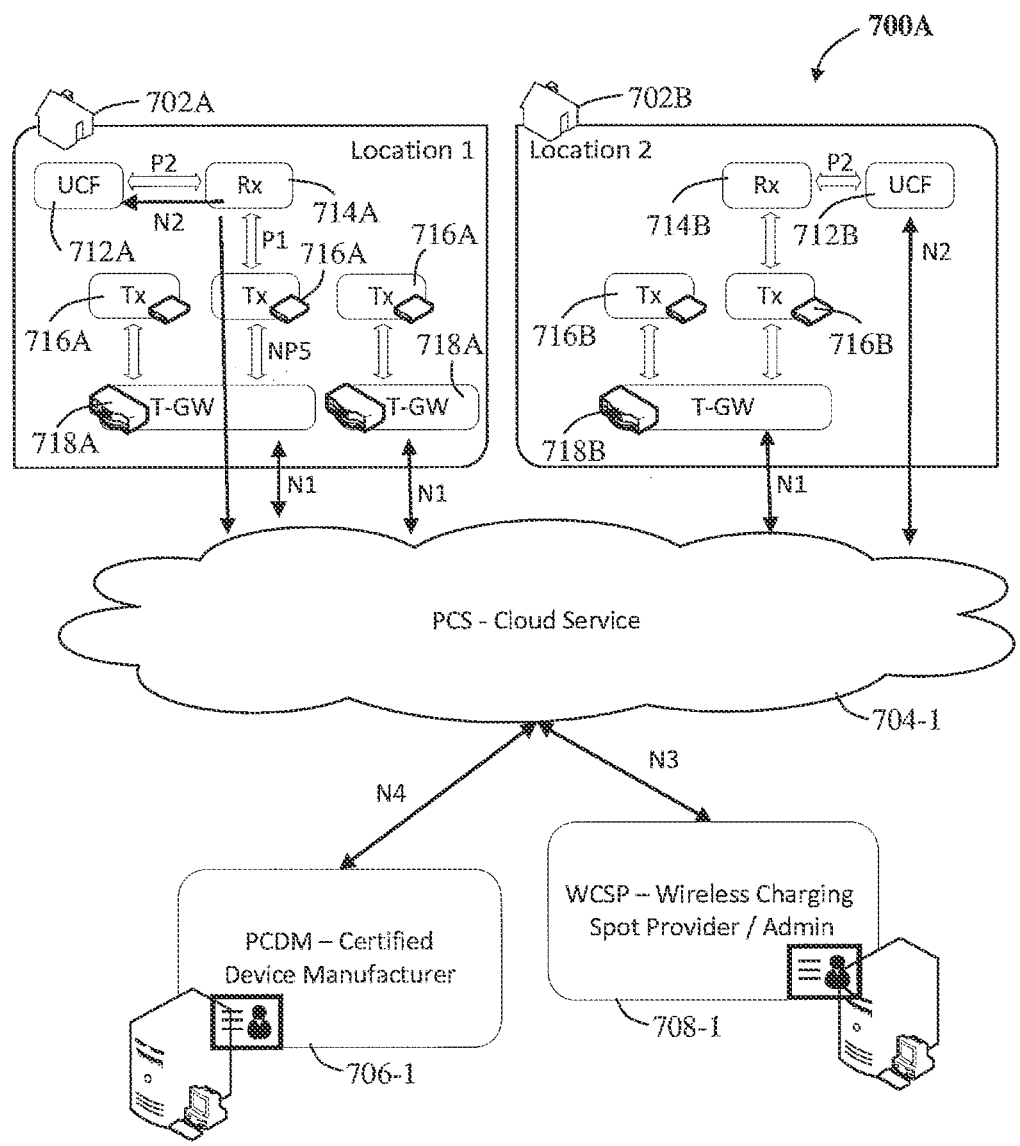
FIG. 7A is a system diagram schematically representing selected components of a network architecture with the various application interfaces.

Reference is now made to the system diagram of FIG. 7A showing a network architecture representation of a wireless power transfer system 700A with various application interfaces.

It is particularly noted that the network architecture representation 700A, the entities and the associated application interfaces may be used to facilitate standardization of the Application Programming Interfaces (APIs) between the various entities while keeping flexibility to accommodate for innovative approaches.

The network architecture representation 700A includes a first venue architecture 702A, a second venue architecture 702B connectable to a certified device manufacturer (PCDM) 706-1 and a wireless charging spot provider (WCSP) 708-1 through a cloud network service (PCS) 704-1. The first venue architecture 702A and the second venue architecture 702B may further include various network entities.

By way of illustration, in this particular embodiment, the first venue architecture 702A may include a wireless power receiver (Rx) 714A entity connectable to at least one wireless power transmitter (Tx) 716A entity in communication with at least one transmitter gateway (T-GW) 718A entity. The wireless power receiver 714A entity may further be connectable to a User Control Function (UCF) 712A entity. The second venue architecture 702A may include a wireless power receiver 714B, wireless power transmitters 716B, and a transmitter gateway (T-GW) 718B entity in a similar network architecture, possibly differing in the number of network entities, depending on venue servicing capability.

Where appropriate, the wireless power receiver is the entity receiving the power possibly for charging or powering an electrical client device.

Where appropriate, the wireless power transmitter is the entity transmitting the power. Optionally, the wireless power transmitter may be operable to support simultaneously a single power receiver and multiple power receivers.

The term T-GW refers to a Transmitter Gateway function, connecting one or more wireless power transmitter entities to the Internet and serving as an aggregator for multiple wireless power transmitter devices located in a venue.

The term UCF refers to a User Control Function, a logical function providing the user with an interface to the charging service. Accordingly, where appropriate, the UCF is operable to provide a user with services such as searching for wireless charging spot locations, device activation, service subscription, statues monitoring and the like. Optionally, a UCF may be collocated with a power receiver or implemented on a separate device.

The term PCS refers to a cloud service, a centralized system providing cloud service management for the wireless power transfer network.

The term PCDM refers to a certified device manufacture.

The term WCSP refers to a wireless charging spot service providers, ranging from a large-scale provider controlling multiple cross-nation wireless charging spot deployments down to a single wireless charging spot coffee shop.

It is particularly noted that the various network entities are connectable via an associated Application Programming Interface API applicable to interfacing any two connectable network entities, as described hereinafter The network architecture representation 700A includes an RX-TX API interface P1 between a wireless power receiver and a transmitter, an RX-UCF API interface P2 between a UCF and a wireless power receiver, a TX-TGW API interface NP5 between a transmitter and a transmitter gateway, a TGW-PCS API interface N1 between a transmitter gateway and a cloud server or network management server, a UCF-PCS API interface N2 between a cloud service or a network management server and a user control function entity, a PCS-WCSP API interface N3 between a cloud service and wireless charging spot service provider, a PCS-PCDM API interface N4 between a cloud service and a certified manufacturer and a UCF API interface S1 for a UCF collocated with an wireless power receiver.

It is noted that where appropriate the RX-UCF API interface P2 may not be required depending on the wireless power receiver type, allowing for support of embedded UCF function as well as aftermarket add on. Accordingly, the P2 API may be technology agnostic.

It is further noted that the TX-TGW API interface NP5 may be an open interface left for vendor specific implementation.

The TGW-PCS API interface N1 may be an IP based interface supporting initial provisioning and initialization of a wireless power transmitter and a T-GW, continuous usage reporting between the two entities and continuous provisioning and policy settings for a wireless power transmitter connected to a T-GW. Support of admission and change control for wireless power receiver devices coupled with the controlling of a wireless power transmitter is further included. Examples of messages for the TGW-PCS API interface N1 are presented below.

The UCF-PCS API interface N2 may be an IP based interface carried over OOB bearer services of the UCF (cellular WLAN etc.). Optionally, the interface N2 may be carried via the wireless charging receiver and transmitter. The UCF-PCS API interface N2 may support charging and service subscription provisioning including billing information where required, charging status reporting and charging spot location data. Additionally, target value messaging from a service provider via PCS may further be supported. Examples of messages for the UCF-PCS API interface N2 are presented below.

The PCS-WCSP API interface N3 may be an IP based interface supporting WCSP initial and continuous provisioning and monitoring of its network entities (Transmitter and T-GW), admission policy settings for power receiver on the different power transmitter devices and usage information combined with statistics on different power transmitter and power receiver devices. The PCS-WCSP API interface N3 further supports handling of power receiver subscription (support for centralized or path-through models for subscription and billing info handling) and policy and usage based targeted messaging configuration.

The PCS-PCDM API interface N4 may support registration of power receiver identifiers (RXIDs) and registration of certified power transmitter identifiers (TXIDs). This interface may allow certified OEMs/ODMs to pre-register their devices with the PCS. Registration may be via a registration form providing company and device details as required.

The UCF API S1 internal interface may provide a set of S/W API for specific OS that allows application layer for accessing power receiver information exposed via the RX-UCF API interface P2. For example, for Android, these may be, inter alia, the APIs for Dalvik application accessing RXID information and power receiver registers or the like. The internal interface may provide for an API to Java like applications to accessing power receiver resources on the platform.

By the way of a non-limiting example, provided for illustrative purposes only, an interface may be described for the Android OS platform, other examples will occur to those skilled in the art. Regarding the Android interface, most of its application written in Java, the Java Virtual Machine is not used, rather another API, the Dalvik API, is used. Similar APIs may be defined for other leading OS in the consumer electronics space.

The API may allow UCF applications development that is abstracted from the specific hardware implementation.

Where existing functionality in Android may include: "public static final int BATTERY_PLUGGED_WIRELESS", the current API may provide additional functionality such as:

final static String getPMAReceiverIDO, which may return the ID of the PMA receiver final static int getHCIreg (int arg), which may retrieve a value for 'arg' register in host controller interface.

void setHCIreg (int arg, int value), which may_set val to 'arg' register in host controller interface (R/W register)

API Examples:

The UCF-PCS API interface N2 may be implemented using JavaScript Object Notation (JSON) over HTTPS link from UCF to PCS. The HTTPS session establishment may include mutual authentication to allow for validation of client identity.

Examples of various communication message types which may be communicated between the UCF and the PCS as appropriate include the following:

GET_PACKAGES messages which may be sent to the cloud server in order to retrieve the list of packages (comprising daily passes) available for purchase. Such purchases may be enabled via online market places such as the Apple App store, Google Play and the like.

ADD_ALLOWANCES messages which may be sent to the cloud server once a package is purchased, whereby the client sends the purchase information including validation receipt and the service adds the purchased day passes.

REDEEM_GIFT_CARD messages which may be sent to the cloud server in order to send a giftcard ID so the server redeems the daily passes to the associated account.

GET_ALLOWANCES messages which may be sent to the cloud server in order to retrieve the number of daily passes for an associated account and the number of free daily minutes this account is entitled to receive.

GET_NEARBY_LOCATIONS messages which may be sent to the cloud server in order to retrieve the closest locations to the provided position.

ADD_ACCOUNT messages which may be sent to the cloud server in order to create an unnamed account for a client, for example identified by a hardware related unique identifier.

REGISTER_ACCOUNT messages which may be sent to the cloud server in order to add personal information to the account.

PUSH_ID messages which may be sent to the cloud server in order to send the server an ID to be added to the account used to send push notifications to the client.

ASSOCIATE_RX messages which may be sent to the cloud server in order to add a receiver to a user account.

DISASSOCIATE_RXmessages which may be sent to the cloud server in order to remove an Rx from an associated account.

RETRIEVE_RX messages which may be sent to the cloud server in order to retrieve the list of receivers associated with a particular account.

GET_COURTESY_CUSTOMER messages which may be sent to the cloud server in order to retrieve the customer sponsoring wireless charging free minutes.

The following examples provide the JSON message format for query of closest charging spots locations.

The GET_NEARBY_LOCATIONS message helps locating nearby venues providing wireless power charging service. Accordingly, the UCF may provide to the cloud server data pertaining to the device location alongside other relevant paraemeters.

The GET_NEARBY_LOCATIONS message may include data pertaining to the license key which is a server provided key authorizing this request.

Other parameters of the "get nearby locations" message may include various parameters such as:
- a 'LICENSE KEY' parameter to provide a license key of a user of the current device,
- a 'MESSAGE_TYPE' parameter to provide a Message name such as "GET_NEARBY_LOCATIONS",
- a 'VERSION' parameter to provide the version of message format thereby enabling the management server to be compatible with multiple communication protocols,
- a 'LATITUDE' parameter to provide the current latitude of the current device,
- a 'LONGITUDE' parameter to provide the current longitude of the current device,
- a 'NUMBER OF RESULTS' parameter to provide The maximum number with nearest venues to be sent in the response,
- a 'TIMESTAMP' parameter to provide a UTC-based report time having a format: YYYY-MM-DDTHH:MM:SSZ where '-', ':', 'T' and 'Z' are constant values,
- a 'CUSTOMERS' parameter to provide a list of chains to filter the result list having a format: ["SBX", "CBTL", "MCD", . . . , "*"], values are acronyms of chains and "*" is a wildcard.

The GET_NEARBY_LOCATIONS response may include a plurality of sets of various data response parameters of the "get nearby locations" message such as:
- a 'MESSAGE_TYPE' parameter to provide a message name such as "GET_NEARBY_LOCATIONS",
- a 'VERSION' parameter to provide the version of message format thereby enabling the management server to be compatible with multiple communication protocols, a 'LOCATIONS' parameter to provide a list of venues filtered according to request and may contain array of venues, as defined hereinbelow, an 'ARRAY OF VENUES' to provide array of nearest locations, with the following parameter, for each entry in the list, a 'STORE' parameter to provide a name of a store, such as "134 5th AVENUE", a 'LATITUDE' latitude value of the store, such as 40.738952, a 'LONGITUDE', longitude value of the store, such as −73.991988, a 'DISTANCE', the distance from the requesting location, such as X (meters), a 'CUSTOMERS', the value of the acronym of the chain this venue is affiliated to, such as "SBX"—acronyms of the chain (may stand for Starbucks).

The GET_NEARBY_LOCATIONS, Example: messages may all share a common standardized headers. For example, the request messages for getting nearby charging spot locations may have headings of the form:

```
> POST /requests HTTP/1.1
Host: app-fe.powermatrix.com
Accept: application/json
Content-type: application/json
Content-Length: 192
```

Likewise, the response message of getting nearby charging spot locations may have headings of the form:

```
< HTTP/1.1 200 OK
Content-Type: application/json
Date: Sun, 05 Jan 2014 15:41:07 GMT
transfer-encoding: chunked
Connection: keep-alive
```

The message body structure itself may follow similar standards for example, where applicable: The body of an HTTPS message delivered to the network server may contain several concatenated messages in a JSON array, the array may contain different types of API messages, including messages for both the Power Module (or wireless power outlet) and the Communication Module.

For example, a message body of GET_NEARBY_LOCATIONS may include multiple messages such as:

```
GET_NEARBY_LOCATIONS {
"LICENSE_KEY": "00000000",
"MESSAGE_TYPE": "GET_NEARBY_LOCATIONS",
"VERSION": "0.0",
"TIMESTAMP":"2012-11-22T14:12:38Z",
"LATITUDE": "00000000",
"LONGITUDE": "00000000",
"RADIOUS": "5000000",
"NUMBER_OF_RESULTS": "30",
"TIMESTAMP":"2012-11-22T14:12:38Z",
"CUSTOMERS": ["SBX", "WFB", "*"]
}
``` and GET_NEARBY_LOCATIONS response may take the message format (header removed) note that multiple sets of parameters are provided under a common heading indicating a plurality of nearby hotspot locations:

```
{
"MESSAGE_TYPE": "GET_NEARBY_LOCATIONS",
"VERSION": "0.0",
LOCATIONS: [
 {
 "STORE": "134 5th AVENUE",
 "LATITUDE": "40.738952",
 "LONGITUDE": "−73.991988",
 "DISTANCE": "133",
 "CUSTOMER": "SBX"
 },
 {"STORE": "Leaky Cauldron"
 "LATITUDE": "51.511906",
 "LONGITUDE": "−0.12847",
 "DISTANCE": "2600000",
 "CUSTOMER": "WFB"
 }
```

A GET_PACKAGES message may retrieve the list of packages or sets of daily passes available for the user to purchase.

Parameters of the "GET_PACKAGES" message may include various parameters such as:
 a 'LICENSE KEY' parameter to provide a license key of a user of the current device,
 a 'MESSAGE_TYPE' parameter to provide a Message name such as "GET_PACKAGES",
 a 'VERSION' parameter to provide the version of message format thereby enabling the management server to be compatible with multiple communication protocols,
 a 'TIMESTAMP' parameter to provide a UTC-based report time having a format: YYYY-MM-DDTHH:MM:SSZ where '-', ':', 'T' and 'Z' are constant values, The response to the 'GET_PACKAGES' message may include various parameters such as:
 a 'MESSAGE_TYPE' parameter to provide a Message name such as "GET_PACKAGES",
 a 'VERSION' parameter to provide the version of message format thereby enabling the management server to be compatible with multiple communication protocols,
 a 'STATUS' parameter to provide additional operational information or errors, this parameter may take a value of 0 to 255 inclusive which may be interpreted according to a list of error codes as outlined below.
 a 'COST' parameter indicating the cost of the associated package.
 a 'DAY_PASSES' parameter indicating the number of day passes provided in the associated package.
 a 'FREE_PASSES' parameter indicating the number of free passes provided in the associated package.

For example the 'GET_PACKAGES' message:

```
REQ(POST): GET_PACKAGES {
"LICENSE_KEY": "00000000",
"MESSAGE_TYPE": "GET_PACKAGES",
"VERSION": "0.0",
"TIMESTAMP":"2012-11-22T14:12:38Z"
}
``` may elicit the following response:

```
RESP :{
"MESSAGE_TYPE": "GET_PACKAGES",
"VERSION": "0.0",
STATUS: "0"
PACKAGES: [{
"PACKAGE_ID": "ID_1",
"COST": "1.00",
```

```
"DAY_PASSES": "1",
"FREE_PASSES": "0",
},{
"PACKAGE_ID": "ID_2",
"COST": "5.00",
"DAY_PASSES": "5",
"FREE_PASSES": "0"
},{
"PACKAGE_ID": "ID_3",
"COST": "9.99",
"DAY_PASSES": "11",
"FREE_PASSES": "1"
}]
}
```

An 'ADD_ALLOWANCES' message may send purchase information associated with a purchased package including validation receipt and the service adds the purchased day passes.

Parameters of the 'ADD_ALLOWANCES' message may include various parameters such as:
- a 'LICENSE KEY' parameter to provide a license key of a user of the current device,
- a 'MESSAGE_TYPE' parameter to provide a Message name such as "ADD_ALLOWANCES",
- a 'VERSION' parameter to provide the version of message format thereby enabling the management server to be compatible with multiple communication protocols,
- a 'TIMESTAMP' parameter to provide a UTC-based report time having a format: YYYY-MM-DDTHH:MM:SSZ where '-', ':', 'T' and 'Z' are constant values,
- a 'TRANSACTION_ID' parameter,
- a 'RECEIPT' parameter,
- a 'ACCOUNT_ID' parameter,
- a 'PACKAGE' parameter indicating the ID associated with a purchased package, The response to the 'ADD_ALLOWANCES' message may include various parameters such as:
- a 'MESSAGE_TYPE' parameter to provide a Message name such as "ADD_ALLOWANCES",
- a 'VERSION' parameter to provide the version of message format thereby enabling the management server to be compatible with multiple communication protocols,
- a 'STATUS' parameter to provide additional operational information or errors, this parameter may take a value of 0 to 255 inclusive which may be interpreted according to a list of error codes as outlined below.
- an 'ALLOWANCE ID' parameter, For example 'ADD_ALLOWANCES' message:

```
REQ(POST): ADD_ALLOWANCES {
"LICENSE_KEY": "00000000",
"MESSAGE_TYPE": "ADD_ALLOWANCES",
"VERSION": "0.0",
"TIMESTAMP":"2012-11-22T14:12:38Z",
"TRANSACTION_ID": "0123456789012345",
"RECEIPT": "...",
"ACCOUNT_ID": "SKJDFHKJHQ123ED",
"PACKAGE": "ID_1"
}
``` may elicit the following response:

```
RESP :{
"MESSAGE_TYPE": "ADD_ALLOWANCES",
"VERSION": "0.0",
"ALLOWANCE_ID": "23423KHFQ3ESKDJHF",
STATUS: "0"
}
```

A 'REDEEM_GIFT_CARD' message may send a gift-card ID in order that the server may redeem the daily passes to the account.

Parameters of the 'REDEEM_GIFT_CARD' message may include various parameters such as:
- a 'LICENSE KEY' parameter to provide a license key of a user of the current device,
- a 'MESSAGE_TYPE' parameter to provide a Message name such as "REDEEM_GIFT_CARD",
- a 'VERSION' parameter to provide the version of message format thereby enabling the management server to be compatible with multiple communication protocols,
- a 'TIMESTAMP' parameter to provide a UTC-based report time having a format: YYYY-MM-DDTHH:MM:SSZ where '-', ':', 'T' and 'Z' are constant values,
- a 'GIFT_CODE' parameter,
- a 'ACCOUNT_ID' parameter, The response to the 'REDEEM_GIFT_CARD' message may include various parameters such as:
- a 'MESSAGE_TYPE' parameter to provide a Message name such as "REDEEM_GIFT_CARD",
- a 'VERSION' parameter to provide the version of message format thereby enabling the management server to be compatible with multiple communication protocols,
- a 'STATUS' parameter to provide additional operational information or errors, this parameter may take a value of 0 to 255 inclusive which may be interpreted according to a list of error codes as outlined below.
- an 'ADDED_DAYS' parameter indicated the number of days added to the allowance period, For example the 'REDEEM_GIFT_CARD' message:

```
REQ(POST): REDEEM_GIFT_CARD {
"LICENSE_KEY": "00000000",
"MESSAGE_TYPE": "REDEEM_GIFT_CARD",
"VERSION": "0.0",
"TIMESTAMP": "2012-11-22T14:12:38Z",
"GIFT CODE": "0123456789012345",
"ACCOUNT_ID": "SKJDFHKJHQ123ED"
}
``` may elicit the following response:

```
RESP :{
"MESSAGE_TYPE": "REDEEM_GIFT_CARD",
"VERSION": "0.0",
"ADDED_DAYS": "3",
STATUS: "0"
}
```

A GET_ALLOWANCES message may retrieve the number of daily passes available for a particular account and the number of free daily minutes the account is entitled to receive.

Parameters of the "GET_ALLOWANCES" message may include various parameters such as:
- a 'LICENSE KEY' parameter to provide a license key of a user of the current device,
- a 'MESSAGE_TYPE' parameter to provide a Message name such as "GET_ALLOWANCES", a 'VERSION' parameter to provide the version of message format thereby enabling the management server to be compatible with multiple communication protocols, a 'TIMESTAMP' parameter to provide a UTC-based report time having a format: YYYY-MM-DDTHH:MM:SSZ where '-', ':', 'T' and 'Z' are constant values, an 'ACCOUNT_ID' parameter, The response to the 'GET_ALLOWANCES' message may include various parameters such as:

a 'MESSAGE_TYPE' parameter to provide a Message name such as "GET_PACKAGES", a 'VERSION' parameter to provide the version of message format thereby enabling the management server to be compatible with multiple communication protocols, an 'ACTIVE_UNTIL' parameter, an 'ACTIVE_DAYS' parameter, a 'DAILY_FREE_MINUTES' parameter, a 'COURTESY_OF' parameter, a 'STATUS' parameter to provide additional operational information or errors, this parameter may take a value of 0 to 255 inclusive which may be interpreted according to a list of error codes as outlined below.

For example the 'XXX' message:

```
REQ(POST): GET_ALLOWANCES {
"LICENSE_KEY": "00000000",
"MESSAGE_TYPE": "GET_ALLOWANCES",
"VERSION": "0.0",
"TIMESTAMP": "2012-11-22T14:12:38Z",
"ACCOUNT_ID": "SKJDFHKJHQ123ED",
}
``` may elicit the following response:

```
RESP :{
"MESSAGE_TYPE": "GET_ALLOWANCES",
"VERSION": "0.0",
"ACTIVE_UNTIL":"2012-11-22T14:12:38Z", ""
"ALLOWED_DAYS": "3",
DAILY_FREE_MINUTES: "30" / "",
COURTESY_OF: "CUST_1" / "",
STATUS: "0"
}
```

An ADD_ACCOUNT message may creates an unnamed account for a client, identified by a hardware related unique identifier.

Parameters of the "ADD_ACCOUNT" message may include various parameters such as:

a 'LICENSE KEY' parameter to provide a license key of a user of the current device, a 'MESSAGE_TYPE' parameter to provide a Message name such as "ADD_ACCOUNT", a 'VERSION' parameter to provide the version of message format thereby enabling the management server to be compatible with multiple communication protocols, a 'TIMESTAMP' parameter to provide a UTC-based report time having a format: YYYY-MM-DDTHH:MM:SSZ where '-', ':', 'T' and 'Z' are constant values, a 'ACCOUNT_TYPE' parameter, a 'DEVICE_ID' parameter.

The response to the 'ADD_ACCOUNT' message may include various parameters such as:

a 'MESSAGE_TYPE' parameter to provide a Message name such as "ADD_ACCOUNT", a 'VERSION' parameter to provide the version of message format thereby enabling the management server to be compatible with multiple communication protocols, a 'STATUS' parameter to provide additional operational information or errors, this parameter may take a value of 0 to 255 inclusive which may be interpreted according to a list of error codes as outlined below, an 'ACCOUNT_ID' parameter.

For example the 'ADD_ACCOUNT' message:

```
ADD_ACCOUNT {
"LICENSE_KEY": "00000000",
"MESSAGE_TYPE": "ADD_ACCOUNT",
"VERSION": "0.0",
"TIMESTAMP":"2012-11-22T14:12:38Z",
"ACCOUNT_TYPE": "GOOGLE" / "APPLE",
"DEVICE_ID": "3329402842048',
}
``` may elicit the following response:

```
RESP :{
"MESSAGE_TYPE": "ADD_ACCOUNT",
"VERSION": "0.0",
"STATUS": "0",
"ACCOUNT_ID": " "
}
```

An PUSH_ID message may send the server an ID to be added to the account used to send push notifications to the client.

Parameters of the PUSH_ID message may include various parameters such as:

a 'LICENSE KEY' parameter to provide a license key of a user of the current device, a 'MESSAGE_TYPE' parameter to provide a Message name such as "PUSH_ID", a 'VERSION' parameter to provide the version of message format thereby enabling the management server to be compatible with multiple communication protocols, a 'TIMESTAMP' parameter to provide a UTC-based report time having a format: YYYY-MM-DDTHH:MM:SSZ where '-', ':', 'T' and 'Z' are constant values, 'ACCOUNT_ID' parameter, and a 'PUSH_ID' parameter.

The response to the 'PUSH_ID' message may include various parameters such as:

a 'MESSAGE_TYPE' parameter to provide a Message name such as "PUSH_ID", a 'VERSION' parameter to provide the version of message format thereby enabling the management server to be compatible with multiple communication protocols, and a 'STATUS' parameter to provide additional operational information or errors, this parameter may take a value of 0 to 255 inclusive which may be interpreted according to a list of error codes as outlined below, For example the 'PUSH_ID' message:

```
PUSH_ID {
"LICENSE_KEY": "00000000",
"MESSAGE_TYPE": "PUSH_ID",
"VERSION: "0.0",
```

```
"TIMESTAMP": "2012-11-22T14:12:38Z",
"ACCOUNT_ID": "WEOIU2342342",
"PUSH_ID": "3329402842048',
}
``` may elicit the following response:

```
RESP :{
"MESSAGE_TYPE": "PUSH_ID",
"VERSION": "0.0",
"STATUS": "0",
}
```

An ASSOCIATE_RX message may add an receiver to an account.

Parameters of the ASSOCIATE_RX message may include various parameters such as:
- a 'LICENSE KEY' parameter to provide a license key of a user of the current device,
- a 'MESSAGE_TYPE' parameter to provide a Message name such as "ASSOCIATE_RX",
- a 'VERSION' parameter to provide the version of message format thereby enabling the management server to be compatible with multiple communication protocols,
- a 'TIMESTAMP' parameter to provide a UTC-based report time having a format: YYYY-MM-DDTHH:MM:SSZ where '-', ':', 'T' and 'Z' are constant values,
- an 'ACCOUNT_ID' parameter, and
- an 'RX_ID' parameter.

The response to the 'ASSOCIATE_RX' message may include various parameters such as:
- a 'MESSAGE_TYPE' parameter to provide a Message name such as "ASSOCIATE_RX",
- a 'VERSION' parameter to provide the version of message format thereby enabling the management server to be compatible with multiple communication protocols,
- a 'STATUS' parameter to provide additional operational information or errors, this parameter may take a value of 0 to 255 inclusive which may be interpreted according to a list of error codes as outlined below, For example the 'ASSOCIATE_RX' message:

```
ASSOCIATE_RX {
"LICENSE_KEY": "00000000",
"MESSAGE_TYPE": "ASSOCIATE_RX",
"VERSION": "0.0",
"TIMESTAMP":"2012-11-22T14:12:38Z",
"ACCOUNT_ID": "ADSLHSLDKFJLSKJFLSJKDF",
"RX_ID ": "ABCDEFABCDEF"
}
``` may elicit the following response:

```
RESP :{
"MESSAGE_TYPE": "ASSOCIATE_RX ",
"VERSION": "0.0",
"STATUS": "0",
}
```

A DISASSOCIATE_RX message may remove a receiver from an account.

Parameters of the DISASSOCIATE_RX message may include various parameters such as:
- a 'LICENSE KEY' parameter to provide a license key of a user of the current device,
- a 'MESSAGE_TYPE' parameter to provide a Message name such as "DISASSOCIATE_RX",
- a 'VERSION' parameter to provide the version of message format thereby enabling the management server to be compatible with multiple communication protocols,
- a 'TIMESTAMP' parameter to provide a UTC-based report time having a format: YYYY-MM-DDTHH:MM:SSZ where '-', ':', 'T' and 'Z' are constant values,
- an 'ACCOUNT_ID' parameter, and
- an 'RX_ID' parameter.

The response to the 'DISASSOCIATE_RX' message may include various parameters such as:
- a 'MESSAGE_TYPE' parameter to provide a Message name such as "DISASSOCIATE_RX",
- a 'VERSION' parameter to provide the version of message format thereby enabling the management server to be compatible with multiple communication protocols, and
- a 'STATUS' parameter to provide additional operational information or errors, this parameter may take a value of 0 to 255 inclusive which may be interpreted according to a list of error codes as outlined below.

For example the 'DISASSOCIATE_RX' message:

```
DEASSOCIATE_RX {
"LICENSE_KEY": "00000000",
"MESSAGE_TYPE": "DEASSOCIATE_RX",
"VERSION": "0.0",
"TIMESTAMP":"2012-11-22T14:12:38Z",
"ACCOUNT_ID": "ADSLHSLDKFJLSKJFLSJKDF",
"RX_ID ": "ABCDEFABCDEF"
}
``` may elicit the following response:

```
RESP :{
"MESSAGE_TYPE": "DEASSOCIATE_RX ",
"VERSION": "0.0",
"STATUS": "0",
}
```

A RETRIEVE_RX message may retrieve the list of receivers associated with a user account.

Parameters of the RETRIEVE_RX message may include various parameters such as:
- a 'LICENSE KEY' parameter to provide a license key of a user of the current device,
- a 'MESSAGE_TYPE' parameter to provide a Message name such as "RETRIEVE_RX",
- a 'VERSION' parameter to provide the version of message format thereby enabling the management server to be compatible with multiple communication protocols,
- a 'TIMESTAMP' parameter to provide a UTC-based report time having a format: YYYY-MM-DDTHH:MM:SSZ where '-', ':', 'T' and 'Z' are constant values,
- an 'ACCOUNT_ID' parameter providing the account ID of the account for which the information is requested.

The response to the RETRIEVE_RX' message may include various parameters such as:
- a 'MESSAGE_TYPE' parameter to provide a Message name such as "RETRIEVE_RX",
- a 'VERSION' parameter to provide the version of message format thereby enabling the management server to be compatible with multiple communication protocols, a 'STATUS' parameter to provide additional operational information or errors, this parameter may take a value of 0 to 255 inclusive which may be interpreted according to a list of error codes as outlined below, an 'RX_LIST' parameter providing a set of receiver IDs associated with the receivers associated with the account ID.

For example the 'RETRIEVE_RX' message:

```
RETRIEVE_RX {
"LICENSE_KEY": "00000000",
"MESSAGE_TYPE": "RETRIEVE_RX",
"VERSION": "0.0",
"TIMESTAMP":"2012-11-22T14:12:38Z",
"ACCOUNT_ID": "ADSLHSLDKFJLSKJFLSJKDF",
}
``` may elicit the following response:

```
RESP :{
"MESSAGE_TYPE": "RETRIEVE_RX",
"VERSION": "0",
"STATUS": "0",
"RX_LIST": [
{"RX_ID":"AALKJSALSKJAS"},
{"RX_ID":"ABCDEFBC666"}
]}
```

An GET_COURTESY_CUSTOMER message may retrieve information related to the customer sponsoring wireless charging free minutes.

Parameters of the GET_COURTESY_CUSTOMER message may include various parameters such as:
- a 'LICENSE KEY' parameter to provide a license key of a user of the current device,
- a 'MESSAGE_TYPE' parameter to provide a Message name such as "GET_COURTESY_CUSTOMER",
- a 'VERSION' parameter to provide the version of message format thereby enabling the management server to be compatible with multiple communication protocols,
- a 'TIMESTAMP' parameter to provide a UTC-based report time having a format: YYYY-MM-DDTHH:MM:SSZ where '-', ':', 'T' and 'Z' are constant values, and
- an 'ACCOUNT_ID' parameter providing the account ID of the account for which the information is requested.

The response to the 'GET_COURTESY_CUSTOMER' message may include various parameters such as:
- a 'MESSAGE_TYPE' parameter to provide a Message name such as "GET_COURTESY_CUSTOMER",
- a 'VERSION' parameter to provide the version of message format thereby enabling the management server to be compatible with multiple communication protocols,
- a 'STATUS' parameter to provide additional operational information or errors, this parameter may take a value of 0 to 255 inclusive which may be interpreted according to a list of error codes as outlined below,
- a 'CUSTOMER' parameter providing the requested customer information.

For example the 'GET_COURTESY_CUSTOMER' message:

```
GET_COURTESY_CUSTOMER {
"LICENSE_KEY": "00000000",
"MESSAGE_TYPE": "GET_COURTESY_CUSTOMER",
"VERSION": "0.0",
"TIMESTAMP":"2012-11-22T14:12:38Z",
"ACCOUNT_ID": "ADSLHSLDKFJLSKJFLSJKDF",
}
``` may elicit the following response:

```
RESP :{
"MESSAGE_TYPE": "GET_COURTESY_CUSTOMER",
"VERSION": "0",
"STATUS": "0",
"CUSTOMER":"DPM"
}
```

Various status values for the status parameter may indicate a plurality of status indications. For example, a value of "1" may indicate: ACCOUNT ALREADY EXISTS, EXISTENT ACCOUNT ID RETURNED, a value of "0" may indicate: OPERATION COMPLETED SUCCESSFULLY, a value of "−1" may indicate: GENERAL ERROR, a value of "−2" may indicate: CONNECTION ERROR. TRY AGAIN, a value of "−3" may indicate: ACCOUNT DOESN'T EXIST, a value of "−4" may indicate: INVALID PACKAGE OR CALLBACK NOT RECEIVED, a value of "−5" may indicate: INVALID RECEIPT, a value of "−6" may indicate: INVALID GIFT CODE, a value of "−7": GIFT CODE ALREADY USED, a value of "−8" may indicate: EMAIL ALREADY EXISTS, a value of "−9" may indicate: INVALID RX, a value of "−10" may indicate: RX ALREADY ASSOCIATED TO ANOTHER ACCOUNT, a value of "−11" may indicate: DEVICE ALREADY ASSOCIATED TO ANOTHER ACCOUNT, a value of "−12" may indicate: INVALID PARAMTERS, a value of "−13" may indicate: TOO MANY RX, a value of "−14" may indicate: PUSH_ID ALREADY_EXISITS, a value of "−17" may indicate: TRANSACTION_AREADY_EXISTS.

Various registers may be utilized in the system for example, a 'RECEIVER_TYPE' register may indicate the type of receiver, a 'TRANSMITTER-_NANOLOCATION' register may indicate the specific location of the transmitter and the like. Still further registers may be employed as required to indicate other aspects such as transmitter types, device types, manufacturer IDs and the like.

Figure 7B:
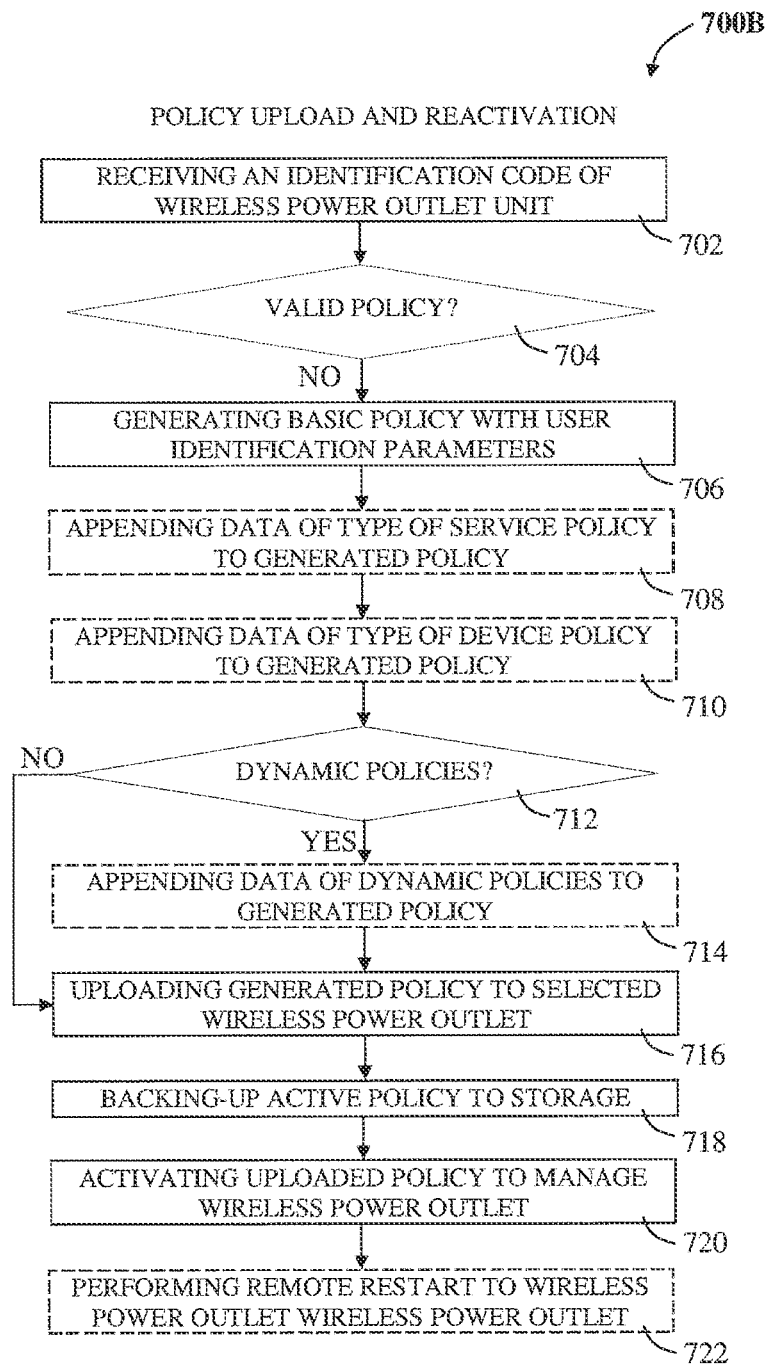
FIG. 7B is a flowchart representing selected actions of a possible method for processing a policy upload and restarting of a wireless power outlet.

Reference is now made to the flowchart of FIG. 7B representing selected actions illustrating a possible method 700B of policy upload to a remote wireless power outlet combined with reactivation, to enforce the newly loaded power management policy.

It is noted that the current method 700B refers to the process of installing an updated power management policy, immediately after installing a new wireless power outlet. A new outlet unit may be configured with no policy at all, allowing by default, power transfer to any mobile device. Optionally, a newly installed outlet unit may be configured to disallow any power transfer, unless a policy governing the power transfer is installed. Where appropriate, a newly installed wireless power outlet may be configured with a default power management policy, including the default conditions to allow/disallow power transfer.

The method 700B includes the management server receiving a communication message containing identification code of the wireless power outlet 702, to allow identification of the outlet unit, assuming previous registration. If there is no policy installed on the outlet unit, or current power management policy is not valid, for example having a temporary default power management policy 704, a new basic power management policy is generated by the management server including user identification parameters 706; optionally, if no user identification is transmitted default value may be inserted and further update upon the first time a user tries to interact with the wireless power outlet for power transfer. Further, additional data related to the type of service policy may be appended to the basic power management policy 708, combined with data related to type of device, as identified 710. If any dynamic policy exists 712, such as real time management of power consumption, real time management of battery health and the like, may further be appended to the basic policy 714. The policy, if configured as a single policy or the set of related policies may be uploaded to the remote wireless power outlet 716. As appropriate, the new policy may be stored on the outlet unit storage device and further back-up the current active policy 718; followed with re-activation of the uploaded policy 720, optionally stopping current power transfer service, and resuming service when the uploaded policy is in command Where appropriate, the activation of the uploaded policy may require restart of the outlet unit 722.

It is noted that all policies may include various default values, such as limits for minimum power level, repeat time and the like and may be configurable by the system administrator of the venue.

The distributed system for providing power transfer disclosed herein may include a wireless power transfer network. The wireless power transfer network may be a managed network of wireless charging transmitters or outlets that provide wireless charging to devices via wireless power receivers. A Network Management Server may provide a management layer for wireless outlets which may be installed in public places. Accordingly, asset management services, monitoring, configuration, maintenance, conditional access, and control may be provided.

The wireless power transfer network may include a network management server in communication with wireless power outlets such as publicly installed charging spots. The management server may control the power provision services from each wireless power outlets according to flexible policy engines such as disclosed herein. Such policies may be set by the venue and based on place, time, user, or user-required-action. Venue installations may consist of several wireless power outlets which may be operable to communicate with the network management server possible via a communication module or the like. Where appropriate, a protocol such as Standard HTTPS or the like may be used to provide security and straightforward IT integration, for example using certificates.

Referring back to FIG. 7A, the TGW-PCS API interface N1 may enable communication between the network management server and satellite elements such as wireless power outlets, communication modules, gateway modules and the like. The TGW-PCS API interface N1 may use an application programming interface (API) for example based on JavaScript Object Notation (JSON), Extensible Markup Language (XML) or the like. Accordingly the network management server may remotely manage the satellite elements.

The TGW-PCS API interface N1 or network messaging protocol may include various messages used for network management such as messages providing tools for maintaining the health, configuration, and control of a Power Module (PM) or wireless power outlet; messages for health and configuration of a Communication Module (CM); or access authorization messages for a new network element such as a power transmitter to join the wireless power transfer network.

Communication security may be provided by using secure communication channels such as an HTTPS connection. Furthermore, communication may include MAC address filtering using transmitter identification codes (TXID), receiver identification codes (RXID), gateway identification codes (GWID) and the like to control network access. Accordingly, TXIDs may be preregistered with the network management server and before the associated power outlet is authorized to join the network and communication is enabled.

Network messages may include a version number uniquely identifying the message format. This may enable a network management to be backward compatible and able to communicate with satellite elements such as power outlets using multiple versions of the communication protocol.

Messages may be further labeled by time stamps and a sequential message identification code (message ID) such that received messages may be validated. For example, a message timestamp may be reported as UTC time zone such that messages sent to the network server may be filtered by time. Accordingly, recent messages may be processed whereas old messages and messages with future time stamps may be ignored.

According to another validation method, the timestamp and message ID may be compared as a check that the messages are sent in sequential order. For example, if a message with a timestamp older than a previous message is sent for a transmitter, the message is ignored. Thus if message n with timestamp of 4:30:50 is received after message n+1 with the earlier timestamp of 4:30:10, message n is ignored, similarly if message n+1 with timestamp of 4:29:10 is received after message n with timestamp of 4:29:40, message n+1 is ignored.

Messages may all share a common standardized headers. For example request messages may have headings of the form:

```
> POST /requests HTTP/1.1
Host: gw-fe.powermatrix.com
Accept: application/json
Content-type: application/json
Content-Length: 192
```

Likewise, request responses, may have headings of the form:

```
< HTTP/1.1 200 OK
Content-Type: application/json
Date: Sun, 05 Jan 2014 15:41:07 GMT
transfer-encoding: chunked
Connection: keep-alive
```

The message body structure itself may follow similar standards for example, where applicable:
  The body of an HTTPS message delivered to the network server may contain several concatenated messages in a JSON array.
  The array may contain different types of API messages, including messages for both the Power Module (or wireless power outlet) and the Communication Module.
  If the Communication Module provides communication for more than one Power Module, the JSON array can contain API messages from more than one or even all of its TxIDs.

For example a message body may include multiple messages such as:

```
[{"MESSAGE_TYPE":"POWERMATRIX_TX_REPORT",
"VERSION":"2",
"TIMESTAMP":"2014-01-05T15:56:42Z",
"MESSAGE_ID":"97",
"TX_ID":"4C766044FC3E",
"RX_ID":"C0E05A725720",
"MODE":"NOT_CHARGING",
"STATUS":"0",
"ERROR_DATA":"0"},
{"MESSAGE_TYPE":"POWERMATRIX_TX_REPORTEXT",
"VERSION":"1",
"TIMESTAMP":"2014-01-05T15:56:52Z",
"MESSAGE_ID":"98",
"TX_ID":"4C766044FC3F",
"RX_ID":"C0E05A725721",
"MODE":"CHARGING",
"STATUS":"0",
"ERROR_DATA":"0",
"TEMPERATURE_1":"46",
"TEMPERATURE_2":"28",
"CURRENT_1":"0",
"CURRENT_2":"0",
"VOLTAGE_IN":"135",
"VOLTAGE_DC2DC":"102",
"DC_PEAK":"0",
"ZB_SIGNAL_QUALITY":"0",
"OVER_DECREMENT":"0"}]
```

It is noted that the message of the example above, includes two message types a status report (here labeled POWERMATRIX_TX_REPORT) and an extended status report (here labeled POWERMATRIX_TX_REPORTEXT) as shall be described herein.

Examples of various communication message types which may be used as appropriate include the following.

Status Report Messages which may be sent to the management server by a power outlet periodically, upon request or ad hoc to report a power outlet's charging status, the ID of a coupled power receiver, and operational errors.

Extended Status Report Messages may be sent to the management server by a power outlet in response to a request from the management server network to provide hardware-dependent diagnostic information.

Status Response Messages which may be sent from the management server to the power outlet in response to a Status Report Message or Extended Status Report Message to provide control commands to instruct the power outlet to execute certain actions.

Configuration Report Messages which may be sent to the management server by a power outlet periodically or when instructed to do so in a Response Message. The Configuration Report Message may provide information to the network manager regarding hardware and software of the power outlet.

Configuration Response Messages which may be sent from the management server to the power outlet in response to a Configuration Report Message to provide configuration commands to instruct the power outlet to execute certain actions pertaining to configuration such as software updates and the like.

Health Status Report Messages which may be sent to the management server by a communication module periodically, when instructed to do so, or ad hoc to provide health status to the network management server.

Health Status Response Messages which may be sent from the management server to the communication module in response to a Health Status Report Message to provide control commands to instruct the communication module to execute certain actions.

Gateway Configuration Report Messages which may be sent to the management server by a communication module periodically, when instructed to do so, or ad hoc. The Configuration Report Message may provide information to the network manager regarding hardware and software of the communication module.

Gateway Configuration Response Messages which may be sent from the management server to the communication module in response to a Gateway Configuration Report Message to provide configuration commands to instruct the power outlet to execute certain actions pertaining to configuration such as firmware updates, software updates, clearing cache, rebooting, archiving logs, setting defaults such as log sizes and the like.

Join Request Messages which may be sent to the management server by a communication module to provide details of a candidate power outlet to be added to the network.

Join Request Response Messages which may be sent from the management server to a communication module in response to Join Request Messages to authorize the addition of the candidate power outlet to the network or to reject the candidate power outlet.

So as to better illustrate the communication protocol of the particular embodiment described herein, reference is now made to the flowcharts of FIGS. 8A-F which show selected actions involved in the communication protocol.

Figure 8A:
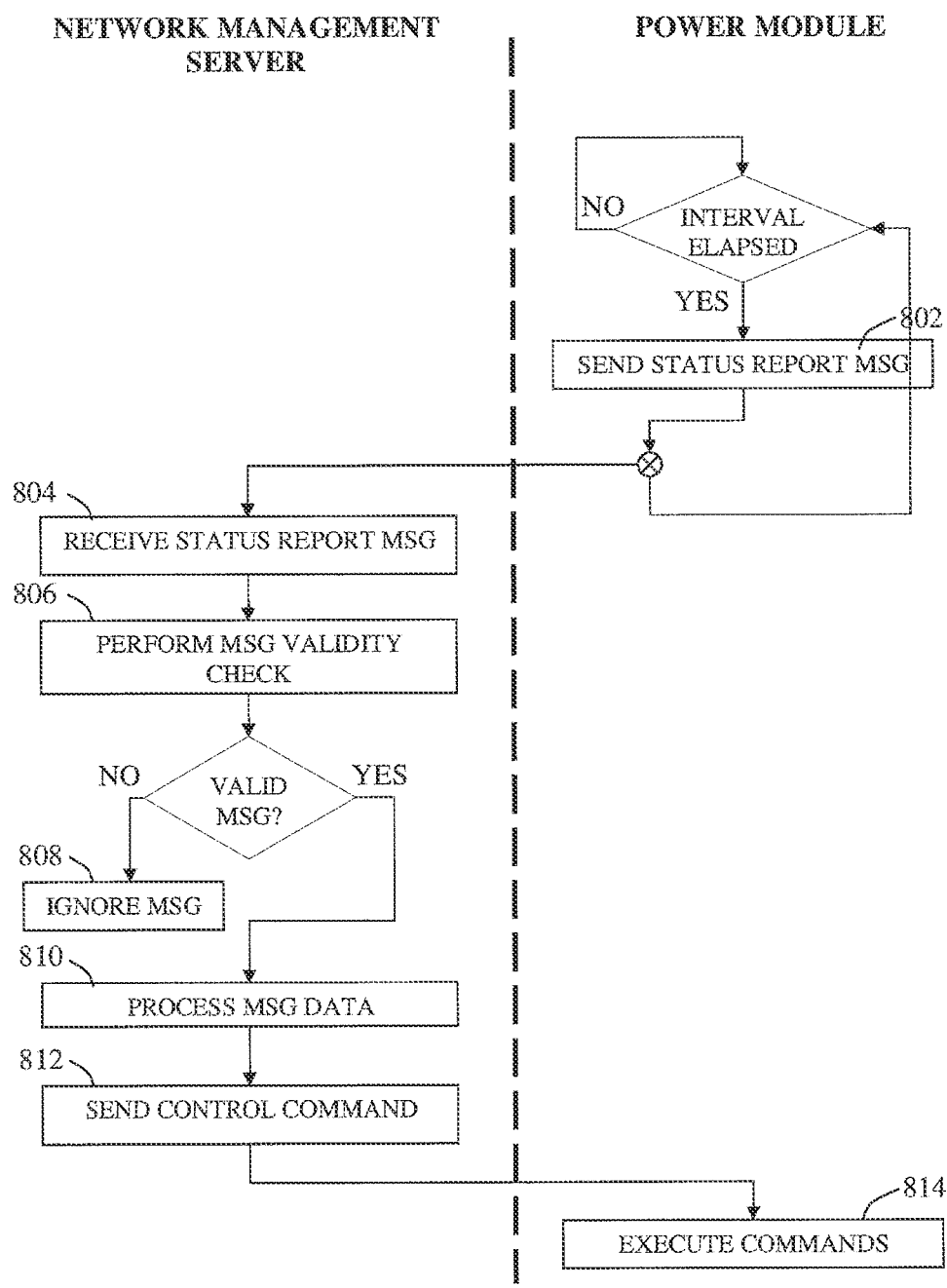
FIG. 8A-F are flowcharts representing various communications between the network management server and other elements of the wireless power transfer network.

With particular reference to the flowchart FIG. 8A, selected actions are presented of a status report communication between the power module to the network management server. Such Power Module messages may be transferred directly or via a communication module, such as described herein as required. A Power Module joined to the wireless power providing network, such as a wireless power outlet may send a status report message 802 at regular intervals. Optionally, the duration of the interval between sending status reports may be determined by instructions received from the network management server as described below.

The status report message may include data pertaining to the operation mode of the power module. Accordingly the report may include a MODE parameter which may take values of "CHARGING" or "NOT_CHARGING" as appropriate.

Other parameters of the status report message may include various parameters such as:
- a 'MESSAGE_TYPE' parameter to provide a Message name such as "POWERMATRIX_TX_REPORT",
- a 'VERSION' parameter to provide the version of message format thereby enabling the management server to be compatible with multiple communication protocols,
- a 'MESSAGE_ID' parameter to provide sequential numbers used in validity checks to detect data loss and ensure sequencing, the value of this parameter may be a repeating sequence from 1 to 255,
- a 'TIMESTAMP' parameter to provide a UTC-based report time having a format: YYYY-MM-DDTHH:MM:SSZ where '-', ':', 'T' and 'Z' are constant values.
- a 'TX_ID' parameter to provide a unique MAC address identifier of the Power Module, this parameter may have a value of a 12 digit hex address without separators, for example "F05DC8011FFB".
- a 'RX_ID' parameter to provide a unique MAC address identifier of the serviced receiver, this parameter may have a 12 digit hex address without separators, for example "4C766044FC3E".

a 'STATUS' parameter to provide additional hardware dependent operational information or errors, this parameter may take a value of 0 to 255 inclusive which may be interpreted according to a list of error codes as outlined herein.

an 'ERROR_DATA' parameter to provide extended hardware dependent data supplementary to the STATUS parameter, this parameter may take a value of 0 to 255.

Various Error codes may be used, by way of illustration, error codes of a particular embodiment may include: an 'Idle, no charge' code of 0 representing Normal operation, a 'Charging Active' code of 1 representing Normal operation , a 'Rx End of Charge (EOC)' code of 2 representing Normal operation which may take a value indicating the EOC Reason such as 0 for Unknown (battery full or Rx safety) or 1 for Requested by the network server, a 'Tx End of charge, no Rx' code of 3 representing Normal operation, a 'No charge, invalid RxID' code of 4 representing a Usage error, a 'No charge, charging disabled by network manager' code of 5 representing a Warning, an 'over temperature' code of 6 representing an Error which may take a value indicating the temperature in Celsius, a '18 v current limit' code of 7 representing a Warning which may take a value Current in mA, a 'out of voltage range' code of 8 representing an Error which may take a value Voltage in MV, a '24v current limit' code of 10 representing an Error which may take a value Current in mV, a 'Last ZB Tx failed' code of 32 representing a Warning, a 'Lost TBD Rx messages' code of 33 representing a Warning, a 'out of frequency range' code of 34 representing a Warning, a 'Remote Firmware Update error' code of 48 representing an Error which may take a value between 0 and 255. It will be appreciated that other error code schemes may be applied as appropriate.

The network management server may receive the status report message 804 and perform a message validity check 806. If the message is deemed invalid, for example if the message ID is not sequential as described above, the received message may be ignored 808. Otherwise, the message data is processed 810 and control commands are generated to be sent back to the power module in a response message 812. The response message may be received by the Power Module and the commands may be executed by a power outlet processor 814.

The control commands may provide instructions to authorize or not authorize power provision according as appropriate. Accordingly, the response message may include a COMMAND parameter which may take values of CHARGE or DO-NOT-CHARGE as appropriate.

Other parameters of the status report response message may include:

a 'MESSAGE_TYPE' parameter to provide a Message name such as "POWERMATRIX_TX_REPORT", a 'VERSION' parameter to provide the version of message format thereby enabling the management server to be compatible with multiple communication protocols, a 'MESSAGE_ID' parameter to provide sequential numbers used in validity checks to detect data loss and ensure sequencing, the value of this parameter may be a repeating sequence from 1 to 255, a 'TIMESTAMP' parameter to provide a UTC-based report time having a format: YYYY-MM-DDTHH:MM:SSZ where '-', ':', 'T' and 'Z' are constant values.

a 'TX_ID' parameter to provide a unique MAC address identifier of the Power Module, this parameter may have a value of a 12 digit hex address without separators, for example "F05DC8011FFB".

a 'RX_ID' parameter to provide a unique MAC address identifier of the serviced receiver, this parameter may have a 12 digit hex address without separators, for example "4C766044FC3E".

an 'INTERVAL' parameter to provide the expected interval between subsequent status report message requests until the value of the INTERVAL is changed, this parameter may take a value of 1 to 1000 seconds inclusive.

a 'SEND_EVENTS' parameter which may take a value of TRUE or FALSE such that when TRUE, the operation MODE changes OR an error occurs, and another status report message is requested and the INTERVAL is reset.

a 'SEND_REPORTEXT_ON_ERROR' parameter which may take a value of TRUE or FALSE such that when TRUE an error occurs and an extended status report message is requested.

a 'SEND_REPORTEXT' parameter which may take a value of TRUE or FALSE such that when TRUE, an extended status report message a is requested immediately.

a 'SEND_TX_CONFIG' parameter which may take a value of TRUE or FALSE such that when TRUE, a configuration report message is requested immediately.

For example a possible Status Report Message may take a form such as:

```
> POST /requests HTTP/1.1
Host: gw-fe.powermatrix.com
Accept: application/json
Content-type: application/json
Content-Length: 192
[{"MESSAGE_TYPE":"POWERMATRIX_TX_REPORT",
"VERSION":"2",
"TIMESTAMP":"2014-01-05T15:56:42Z",
"MESSAGE_ID":"97",
"TX_ID":"4C766044FC3E",
"RX_ID":"C0E05A725720",
"MODE":"NOT_CHARGING",
"STATUS":"0",
"ERROR_DATA":"0"},...]
```

A similar example of a possible Status Response Message may take a form such as:

```
< HTTP/1.1 200 OK
Content-Type: application/json
Date: Sun, 05 Jan 2014 15:41:07 GMT
transfer-encoding: chunked
Connection: keep-alive
[{"MESSAGE_TYPE": "POWERMATRIX_TX_REPORT",
"VERSION": "1",
"MESSAGE_ID":"97",
"TX_ID":"4C766044FC3E",
"RX_ID":"C0E05A725720",
"COMMAND":"CHARGE",
"INTERVAL":"10",
"SEND_EVENTS": "TRUE",
"SEND_REPORTEXT_ON_ERROR"= "TRUE",
"SEND_REPORTEXT"= "TRUE",
"SEND_TX_CONFIG"="TRUE"}]
```

Figure 8B:
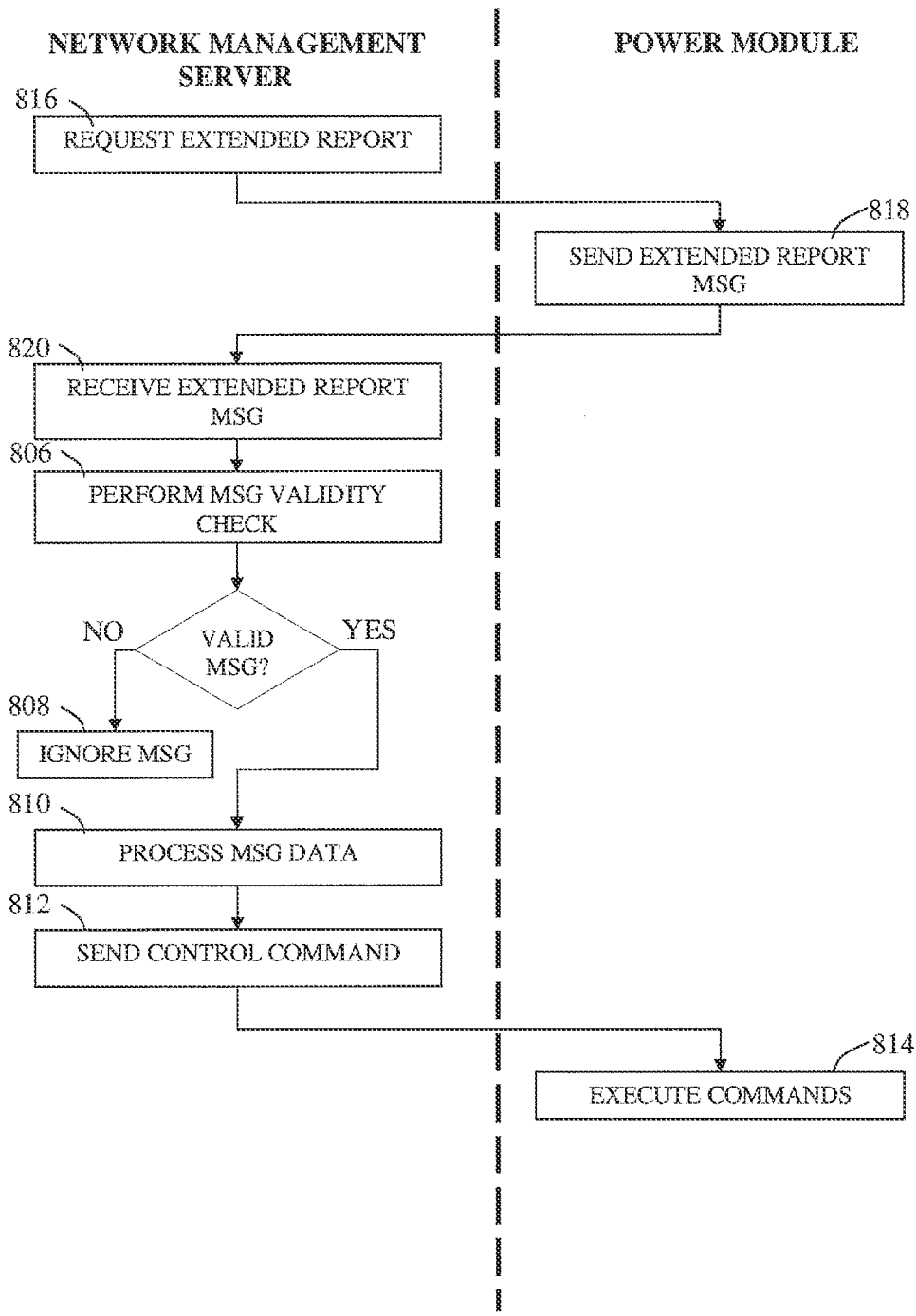

Referring now to the flowchart FIG. 8B, selected actions are presented of an extended status report communication between the power module and the network management server. Such Power Module messages may be transferred directly or via a communication module, such as described herein as required. The network management server may request such an extended status report 816, such as described above via the 'SEND_REPORTEXT' parameter or 'SEND_REPORTEXT_ON_ERROR' parameter. Accordingly, the Power Module may send an Extended Status Report Message 818. The Extended Status Report Message is an extensive list of hardware related diagnostic information. Amongst others, parameters of an extended status report message may include:

- a 'MESSAGE_TYPE' parameter to provide a Message name such as "POWERMATRIX_TX_REPORTEXT",
- a 'VERSION' parameter to provide the version of message format thereby enabling the management server to be compatible with multiple communication protocols,
- a 'MESSAGE_ID' parameter to provide sequential numbers used in validity checks to detect data loss and ensure sequencing, the value of this parameter may be a repeating sequence from 1 to 255,
- a 'TIMESTAMP' parameter to provide a UTC-based report time having a format: YYYY-MM-DDTHH:MM:SSZ where '-', ':', 'T' and 'Z' are constant values.
- a 'TX_ID' parameter to provide a unique MAC address identifier of the Power Module, this parameter may have a value of a 12 digit hex address without separators, for example "F05DC8011FFB".
- a 'RX_ID' parameter to provide a unique MAC address identifier of the serviced receiver, this parameter may have a 12 digit hex address without separators, for example "4C766044FC3E".
- a 'MODE' parameter which may take values of "CHARGING" or "NOT_CHARGING" as appropriate.
- a 'STATUS' parameter to provide additional hardware dependent operational information or errors, this parameter may take a value of 0 to 255 inclusive which may be interpreted according to a list of error codes as described herein for example.
- an 'ERROR_DATA' parameter to provide extended hardware dependent data supplementary to the STATUS parameter, this parameter may take a value of 0 to 255.
- a 'TEMPERATURE_1' parameter to provide a temperature reading from the MCU board of the power module, this parameter may take values of 0 to 255 Celsius, a negative measurement should be sent as 0
- a 'TEMPERATURE_2' parameter to provide a temperature reading from the upper board of the power module, this parameter may take values of 0 to 255 Celsius, a negative measurement should be sent as 0
- a 'CURRENT_1' parameter to provide a first Ampère meter measurement, this parameter may take values of 0 to 255 indicating the measured current in milliamperes divided by 16.
- a 'CURRENT_2' parameter to provide a second Ampère meter measurement, this parameter may take values of 0 to 255 indicating the measured current in milliamperes divided by 16.
- a 'VOLTAGE_IN' parameter to provide a voltage measurement, this parameter may take values of 0 to 255 indicating the measured voltage in millivolts divided by 176.
- a 'VOLTAGE_DC2DC' parameter to provide a voltage measurement, this parameter may take values of 0 to 255 indicating the measured voltage in millivolts divided by 176.
- a 'DC_PEAK' parameter to indicate the presence of an object upon the power outlet, the parameter may take values of 0 to 255 in millivolts divided by 16.
- a 'OVER_DECREMENT' parameter to provide a maximum allowed decrement, this parameter may take values of 0 to 255 in millivolts divided by 16

Accordingly, the network management server may receive the extended status report message 820 and perform a message validity check 806. If the message is deemed invalid, for example if the message ID is not sequential as described above, the received message may be ignored 808. Otherwise, the message data is processed 810 and control commands are generated to be sent back to the power module in a response message 812. The response message may be received by the Power Module and the commands may be executed by a power outlet processor 814.

For example a possible Extended Status Report Message may take a form such as:

```
> POST /requests HTTP/1.1
Host: gw-fe.powermatrix.com
Accept: application/json
Content-type: application/json
Content-Length: 192
[{"MESSAGE_TYPE":"POWERMATRIX_TX_REPORTEXT",
"VERSION":"1",
"TIMESTAMP":"2014-01-05T15:56:42Z",
"MESSAGE_ID":"97",
"TX_ID":"4C766044FC3E",
"RX_ID":"C0E05A725720",
"MODE":"NOT_CHARGING",
"STATUS":"0",
"ERROR_DATA":"0",
"TEMPERATURE_1":"46",
"TEMPERATURE_2":"28",
"CURRENT_1":"0",
"CURRENT_2":"0",
"VOLTAGE_IN":"135",
"VOLTAGE_DC2DC":"102",
"DC_PEAK":"0",
"OVER_DECREMENT":"0"},...]
``` which may elicit a response such as:

```
< HTTP/1.1 200 OK
Content-Type: application/json
Date: Sun, 05 Jan 2014 15:41:07 GMT
transfer-encoding: chunked
Connection: keep-alive
[{"MESSAGE_TYPE": "POWERMATRIX_TX_REPORTEXT",
"VERSION": "1",
"MESSAGE_ID'":"97",
"TX_ID":"4C766044FC3E",
"RX_ID":" C0E05A725720",
"COMMAND":"CHARGE",
"INTERVAL":"10",
"SEND_EVENTS": "TRUE",
"SEND_REPORTEXT_ON_ERROR"= "TRUE",
"SEND_REPORTEXT"= "TRUE",
"SEND_TX_CONFIG"="TRUE"
}]
```

Figure 8C:
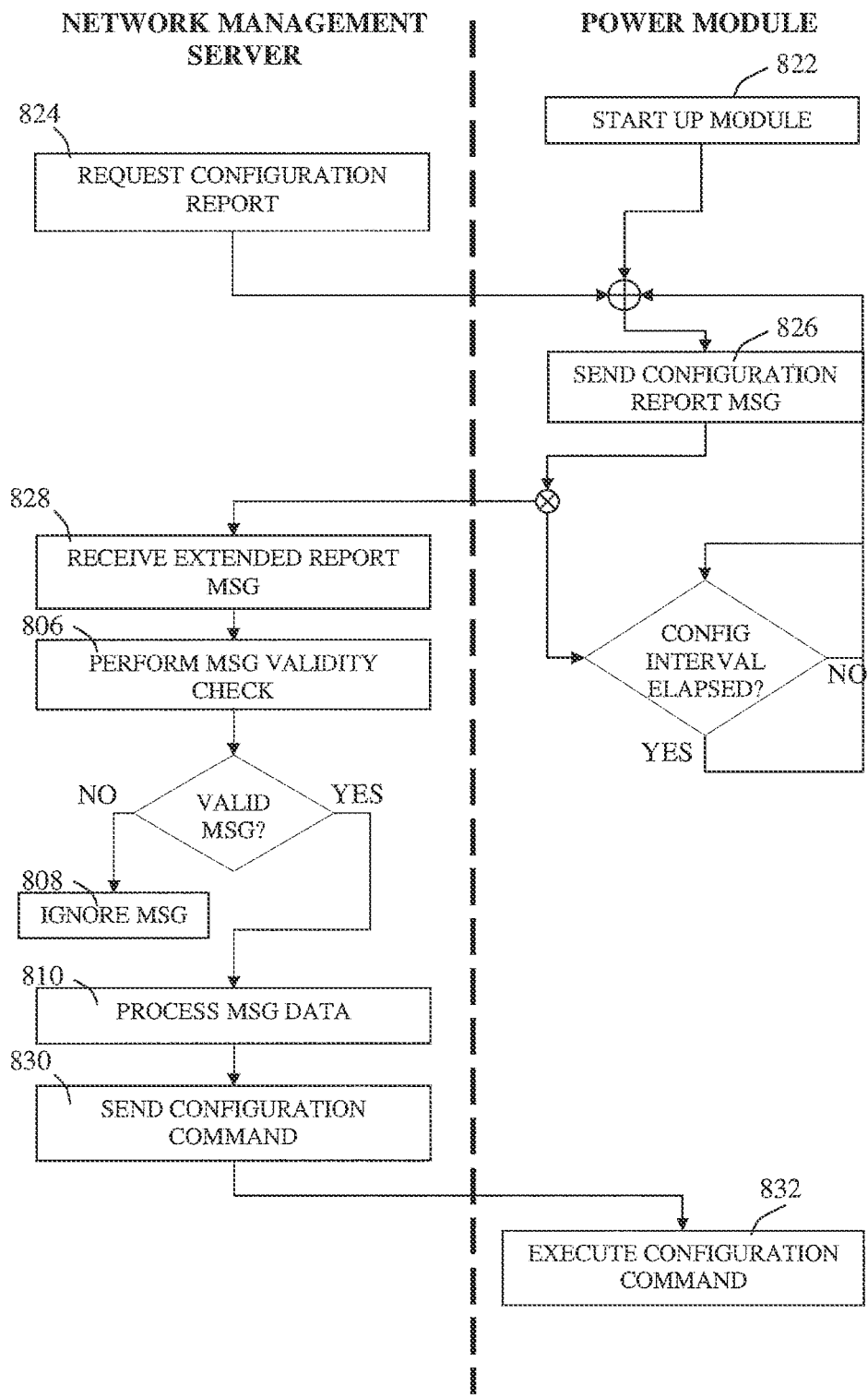

Referring now to the flowchart FIG. 8C, selected actions are presented of a configuration report communication between the power module and the network management server. Such Power Module messages may be transferred directly or via a communication module, such as described herein as required. A configuration report may be sent to the network management server 826 upon startup 822. Alternatively, the network management server may request such a configuration report 824, such as described above via the 'SEND_TX_CONFIG' parameter of the status report response message. Accordingly, the Power Module may send a Configuration Report Message 826. The Configuration Report Message is a message issued by the power module to provide information about the configuration of the power module. The response message provides the mechanism for remote configuration and maintenance.

For instance, the 'CHARGER_FIRMWARE_VERSION' parameter and the 'HW_VERSION' parameter may contain the version of the firmware and hardware in the power module device.

Amongst others, parameters of a Power Module Configuration Report Message may include:
- a 'MESSAGE_TYPE' parameter to provide a Message name such as "POWERMATRIX_TX_CONFIG",
- a 'VERSION' parameter to provide the version of message format thereby enabling the management server to be compatible with multiple communication protocols,
- a 'MESSAGE_ID' parameter to provide sequential numbers used in validity checks to detect data loss and ensure sequencing, the value of this parameter may be a repeating sequence from 1 to 255,
- a 'TIMESTAMP' parameter to provide a UTC-based report time having a format: YYYY-MM-DDTHH:MM:SSZ where '-', ':', 'T' and 'Z' are constant values.
- a 'GW_ID' parameter to provide a unique MAC address identifier of the communication module, this parameter may have a value of a 12 digit hex address without separators, for example '4C766044FC3E'.
- a 'TX_ID' parameter to provide a unique MAC address identifier of the Power Module, this parameter may have a value of a 12 digit hex address without separators, for example "F05DC8011FFB".
- a 'CHARGER_FIRMWARE_VERSION' parameter to provide the firmware version of the Power Module, this parameter may have a value of 'X.Y', where X and Y are positive integers.
- a 'ZB_FIRMWARE_VERSION' parameter to provide the firmware version of the Zigbee component in the Power Module, this parameter may have a value of 'X.Y', where X and Y are positive integers if this is implemented or if this does not exist the parameter may take a value of '0.0'.
- a 'HW_VERSION' parameter to provide the hardware version of the Power Module, this parameter may have a value of 'X.Y', where X and Y are positive integers.
- a 'REASON' parameter to provide a reason for issuing the message, this parameter may take values selected from 'RESET' or 'BY_REQUEST' as appropriate.

Accordingly, the network management server may receive the Configuration Report Message 828 and perform a message validity check 806. If the message is deemed invalid, for example if the message ID is not sequential as described above, the received message may be ignored 808. Otherwise, the message data is processed 810 and Configuration Commands are generated to be sent back to the power module in a response message 830. The response message may be received by the Power Module and the configuration commands may be executed by a power outlet processor 832. It will be appreciated that a message validity check may be performed by the power outlet processor as required.

In response to the Configuration Report Message, the Network management server may issue commands to change the firmware version for example using UPDATE_CHARGER_FIRMWARE) or to perform remote maintenance, such as reset (RESET).

Amongst others, parameters of Configuration Response Message may include:
- a 'MESSAGE_TYPE' parameter to provide a Message name such as "POWERMATRIX_TX_CONFIG",
- a 'VERSION' parameter to provide the version of message format thereby enabling the management server to be compatible with multiple communication protocols,
- a 'MESSAGE_ID' parameter to provide sequential numbers used in validity checks to detect data loss and ensure sequencing, the value of this parameter may be a repeating sequence from 1 to 255,
- a 'TIMESTAMP' parameter to provide a UTC-based report time having a format: YYYY-MM-DDTHH:MM:SSZ where '-', ':', 'T' and 'Z' are constant values.
- a 'GW_ID' parameter to provide a unique MAC address identifier of the communication module, this parameter may have a value of a 12 digit hex address without separators, for example '4C766044FC3E'.
- a 'TX_ID' parameter to provide a unique MAC address identifier of the Power Module, this parameter may have a value of a 12 digit hex address without separators, for example "F05DC8011FFB".
- a 'CHARGER_FIRMWARE_VERSION' parameter to provide the firmware version to which the Power Module should be upgraded if the 'UPDATE_CHARGER_FIRMWARE' parameter is TRUE, this parameter may have a value of 'X.Y', where X and Y are positive integers.
- a 'VENDOR_ID' parameter to provide the identification code of the power module vendor, this parameter may take values of a Hex string.
- a 'ZB_FIRMWARE_VERSION' parameter to provide the Zigbee component version to which the Power Module should be upgraded if the 'UPDATE_ZB_FIRMWARE' parameter is TRUE, this parameter may have a value of 'X.Y', where X and Y are positive integers or if this does not exist the parameter may take a value of '0.0'.
- an 'UPDATE_CHARGER_FIRMWARE' parameter which may take a value of TRUE in order to instruct the power module processor to update the power module firmware or a value of 'FALSE' if the firmware version is not to be updated.
- an 'UPDATE_ZB_FIRMWARE' parameter which may take a value of TRUE in order to instruct the power module processor to update the power module Zigbee component or a value of 'FALSE' if the Zigbee component is not to be updated.
- a 'RESET' parameter which may take a value of TRUE in order to instruct the power module processor to reset itself or a value of 'FALSE' if not.
- a 'LEDS' parameter which may take a value of TRUE in order to instruct the power module processor to enable optical feedback or a value of 'FALSE' to instruct the power module processor to disable optical feedback.
- a 'SOUND' parameter which may take a value of TRUE in order to instruct the power module processor to enable audio feedback or a value of 'FALSE' to instruct the power module processor to disable audio feedback.
- a 'DISABLE_CHARGER' parameter which may take a value of TRUE in order to instruct the power module processor to disable the power module or a value of 'FALSE' if not.
- a 'CURRENT_LIMIT' parameter to limit the amount of current sent to the receiver, the parameter may have a value of $(x-350)/20$ where x is the value to which the limit is to be set.
- an 'INDUCTION_SENSOR_SENSITIVITY' parameter to set an analogue ping voltage detection sensitivity, the parameter may have a value of $(x-10)/20$ where x is the value to which the sensitivity is to be set.

a 'DC_PEAK_LIMIT_THRESHOLD' parameter to set a primary peak threshold as required, the parameter may have a value of (x−100)/250 where x is the value to which the threshold is to be set . . .

a 'TSLEEP' parameter to set a delay time after which the power module is to attempt to transfer power, the parameter may have a value of x−1 wherein x is the number of minutes, or 255 to disable retries.

For example a possible Configuration Report Message may take a form such as:

```
> POST /requests HTTP/1.1
Host: gw-fe.powermatrix.com
Accept: application/json
Content-type: application/json
Content-Length: 192
[{"MESSAGE_TYPE":"POWERMATRIX_TX_CONFIG",
"VERSION":"1",
"TIMESTAMP":"2014-0106T21:48:17Z",
"MESSAGE_ID":"101",
"GW_ID":"00409D52FEB5",
"TX_ID":"F05DC8011FE2",
"CHARGER_FIRMWARE_VERSION":"0.18",
"VENDOR_ID":"A37",
"ZB_FIRMWARE_VERSION":"3.8",
"HW_VERSION":"4.0",
"REASON":"BY_REQUEST"},...]
``` which may elicit a Configuration Response Message such as:

```
< HTTP/1.1 200 OK
Content-Type: application/json
Date: Sun, 05 Jan 2014 15:41:07 GMT
transfer-encoding: chunked
Connection: keep-alive
[{MESSAGE_TYPE":"POWERMATRIX_TX_CONFIG",
"VERSION":"1",
"TX_ID":"F05DC8011FE2",
"MESSAGE_ID":"101",
"CHARGER_FIRMWARE_VERSION":"0.18",
"VENDOR_ID":"A37",
"CM_FIRMWARE_VERSION":"3.8",
"UPDATE_CHARGER_FIRMWARE":"FALSE",
"UPDATE_ZB_FIRMWARE":"FALSE",
"RESET":"FALSE",
"LEDS":"TRUE",
"SOUND":"TRUE",
"DISABLE_CHARGER":"FALSE",
"CURRENT_LIMIT":"7",
"INDUCTION_SENSOR_SENSITIVITY":"2",
"DC_PEAK_LIMIT_THRESHOLD":"1"},...]
```

Figure 8D:
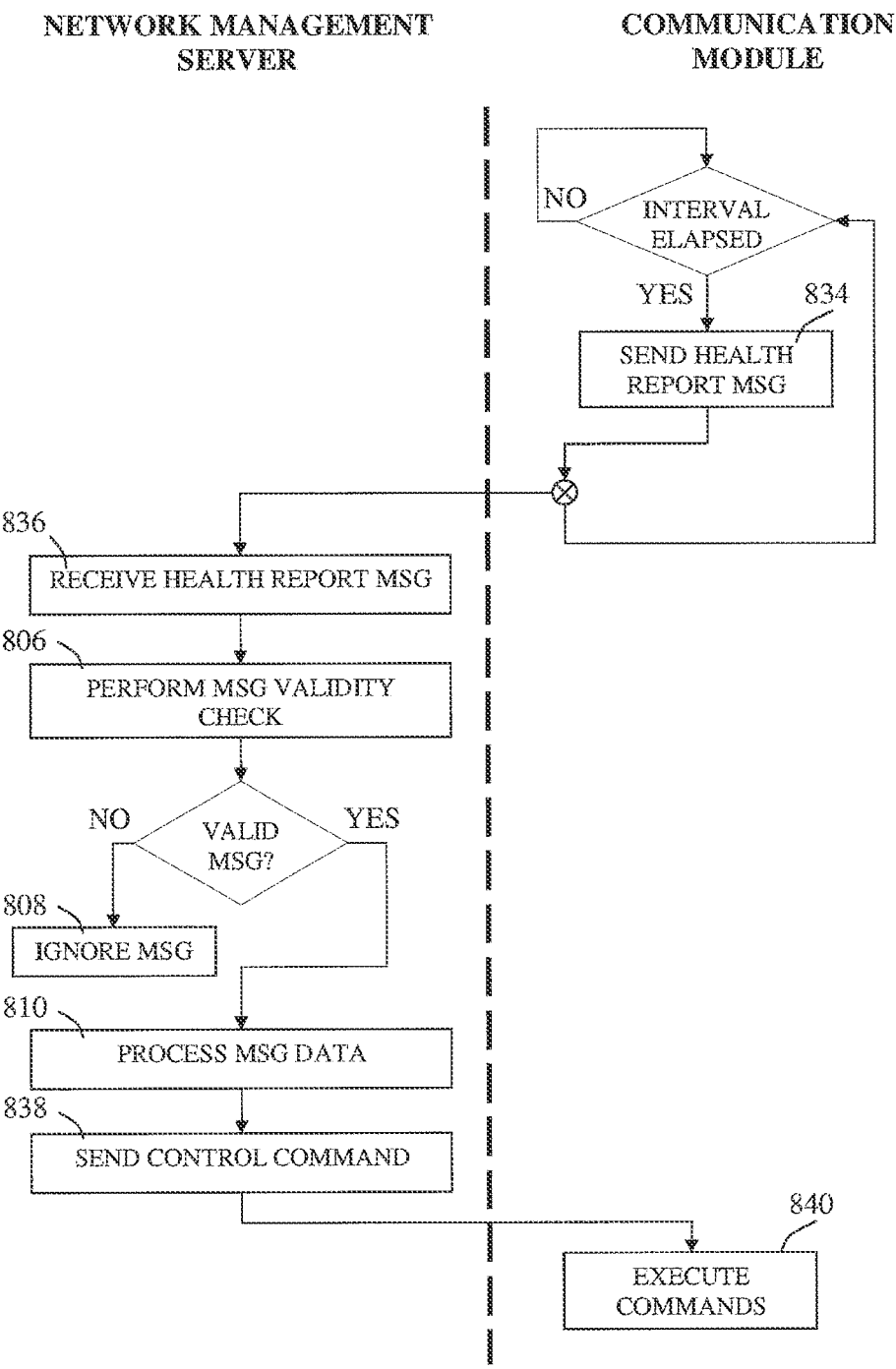

Referring now to the flowchart FIG. 8D, selected actions are presented of a health report communication between a communication module or gateway and the network management server. The communication module may be joined to the wireless power providing network and enable communication and control of power modules from the network management server. Such a communication module may send periodic Health Report Messages 834 at regular intervals. The Health Report Message may provide data pertaining to the health status of the communication module.

Accordingly, the Health Report Message may include various parameters such as:
- a 'MESSAGE_TYPE' parameter to provide a Message name such as "POWERMATRIX_GW_REPORT",
- a 'VERSION' parameter to provide the version of message format thereby enabling the management server to be compatible with multiple communication protocols,
- a 'MESSAGE_ID' parameter to provide sequential numbers used in validity checks to detect data loss and ensure sequencing, the value of this parameter may be a repeating sequence from 1 to 255,
- a 'TIMESTAMP' parameter to provide a UTC-based report time having a format: YYYY-MM-DDTHH:MM:SSZ where '-', ':', 'T' and 'Z' are constant values.
- a 'GW_ID' parameter to provide a unique MAC address identifier of the communication module, this parameter may have a value of a 12 digit hex address without separators, for example '37290B2597A8'.
- a 'STATUS' parameter to provide additional hardware dependent operational information or errors, this parameter may take a value of 0 to 255 inclusive which may be interpreted according to a list of error codes as outlined below.
- optionally an 'ERROR_DATA' parameter to provide extended hardware dependent data supplementary to the STATUS parameter, this parameter may take a value of 0 to 255.

The network management server may receive the Health Report Message 836 and perform a message validity check 806. If the message is deemed invalid, for example if the message ID is not sequential as described above, the message may be ignored 808. Otherwise, the message data is processed 810 and Control Commands are generated to be sent back to the power module in a response message 838. The response message may be received by the Power Module and the configuration commands may be executed by a control module processor 840. It will be appreciated that a message validity check may be performed by the communication module processor as required.

The network manager may generate various responses to the Health Report Message 836 which may be communicated in a Health Report Response message. Accordingly, a Health Report Response Message may include various parameters such as:
- a 'MESSAGE_TYPE' parameter to provide a Message name such as "POWERMATRIX_GW_REPORT",
- a 'VERSION' parameter to provide the version of message format thereby enabling the management server to be compatible with multiple communication protocols,
- a 'MESSAGE_ID' parameter to provide sequential numbers used in validity checks to detect data loss and ensure sequencing, the value of this parameter may be a repeating sequence from 1 to 255,
- a 'TIMESTAMP' parameter to provide a UTC-based report time having a format: YYYY-MM-DDTHH:MM:SSZ where '-', ':', 'T' and 'Z' are constant values.
- a 'GW_ID' parameter to provide a unique MAC address identifier of the communication module, this parameter may have a value of a 12 digit hex address without separators, for example '37290B2597A8'.
- an 'INTERVAL' parameter to provide the expected interval between subsequent health report message requests until the value of the INTERVAL is changed, this parameter may take a value of 1 to 1000 seconds inclusive.
- an 'ALLOW_JOIN' parameter which may have a default value of FALSE but may take a value of TRUE to instruct the communication module processor to request the addition of power modules to the network.

For example a possible Health Report Message may take a form such as:

```
REQ (POST): [{"MESSAGE_TYPE":
"POWERMATRIX_GW_REPORT",
```

-continued

```
"VERSION": "1",
"MESSAGE_ID": "243",
"TIMESTAMP":"2012-11-22T14:12:38Z",
"GW_ID": "ABCDEFABCDEFABCD",
"STATUS": "0"},...]
``` which may elicit a response such as such as:

```
RESP: [{"MESSAGE_TYPE": "POWERMATRIX_GW_REPORT",
"VERSION": "1",
"MESSAGE_ID":"244",
"GW_ID":"ABCDEFABCDEFABCD",
"INTERVAL": "10",
"ALLOW_JOIN": "TRUE"/"FALSE"}]
```

Figure 8E:
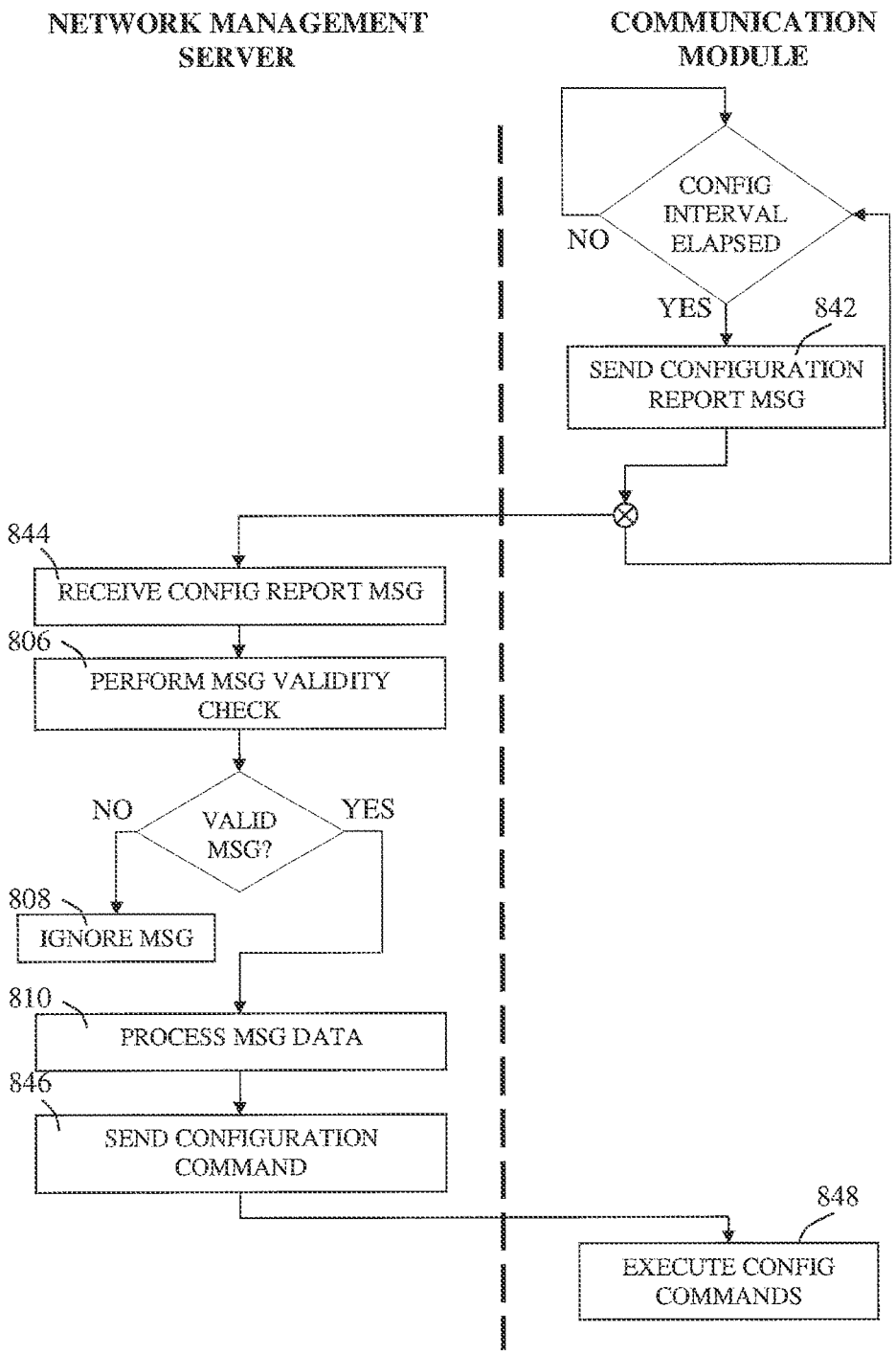

Referring now to the flowchart FIG. 8E, selected actions are presented of a configuration report communication between the communication module and the network management server. A configuration report may be sent to the network management server 842 periodically at regular intervals or upon startup. Accordingly, the Power Module may send a Configuration Report Message 842. The Configuration Report Message is a message issued by the communication module to provide information about the configuration of the communication module. The response message provides the mechanism for remote configuration and maintenance of the gateway.

Amongst others, parameters of a Communication Module Configuration Report Message may include:
- a 'MESSAGE_TYPE' parameter to provide a Message name such as "POWERMATRIX_GW_CONFIG",
- a 'VERSION' parameter to provide the version of message format thereby enabling the management server to be compatible with multiple communication protocols,
- a 'MESSAGE_ID' parameter to provide sequential numbers used in validity checks to detect data loss and ensure sequencing, the value of this parameter may be a repeating sequence from 1 to 255,
- a 'TIMESTAMP' parameter to provide a UTC-based report time having a format: YYYY-MM-DDTHH:MM:SSZ where '-', ':', 'T' and 'Z' are constant values.
- a 'GW_ID' parameter to provide a unique MAC address identifier of the communication module, this parameter may have a value of a 12 digit hex address without separators, for example '4C766044FC3E'.
- a 'FIRMWARE_VERSION' parameter to provide the firmware version of the communication module, this parameter may have a value of 'X.Y', where X and Y are positive integers.
- a 'SOFTWARE_VERSION' parameter to provide the software version of the communication module, this parameter may have a value of 'X.Y', where X and Y are positive integers.
- a 'FREE_MEMORY' parameter to provide the amount of available memory, this parameter may take a value representing the number of free Kilobytes.
- a 'FREE_FLASH' parameter to provide the amount of available flash memory, this parameter may take a value representing the number of free Kilobytes.
- a 'CPU' parameter to provide the percentage communication module processor CPU utilization, this parameter may take a value representing the Percentage
- a 'REASON' parameter to provide a reason for issuing the message, this parameter may take values selected from 'RESET' or 'BY_REQUEST' as appropriate.

Accordingly, the network management server may receive the Configuration Report Message 844 and perform a message validity check 806. If the message is deemed invalid, for example if the message ID is not sequential as described above, the received message may be ignored 808. Otherwise, the message data is processed 810 and Configuration Commands are generated to be sent back to the communication module in a response message 846. The response message may be received by the Communication Module and the configuration commands may be executed by a communication module processor 848. It will be appreciated that a message validity check may be performed by the communication module processor as required.

Amongst others, parameters of Configuration Response Message may include:
- a 'MESSAGE_TYPE' parameter to provide a Message name such as "POWERMATRIX_GW_CONFIG",
- a 'VERSION' parameter to provide the version of message format thereby enabling the management server to be compatible with multiple communication protocols,
- a 'MESSAGE_ID' parameter to provide sequential numbers used in validity checks to detect data loss and ensure sequencing, the value of this parameter may be a repeating sequence from 1 to 255,
- a 'TIMESTAMP' parameter to provide a UTC-based report time having a format: YYYY-MM-DDTHH:MM:SSZ where '-', ':', 'T' and 'Z' are constant values.
- a 'GW_ID' parameter to provide a unique MAC address identifier of the communication module, this parameter may have a value of a 12 digit hex address without separators, for example '4C766044FC3E'.
- a 'FIRMWARE_VERSION' parameter to provide the firmware version to which the Communication Module should be upgraded if the 'UPDATE_FIRMWARE' parameter is TRUE, this parameter may have a value of 'X.Y', where X and Y are positive integers.
- a 'SW_VERSION' parameter to provide the software version to which the Communication Module should be upgraded if the 'UPDATE_SOFTWARE' parameter is TRUE, this parameter may have a value of 'X.Y', where X and Y are positive integers.
- an 'UPDATE_FIRMWARE' parameter which may take a value of TRUE in order to instruct the communication module processor to update the communication module firmware or a value of 'FALSE' if the firmware version is not to be updated.
- an 'UPDATE_SOFTWARE' parameter which may take a value of TRUE in order to instruct the communication module processor to update the communication module software or a value of 'FALSE' if the firmware version is not to be updated.
- a 'REBOOT' parameter which may have a default value of FALSE and may take a value of TRUE in order to instruct the power module processor to reboot itself.
- a 'AGGREGATION_INTERVAL' parameter to provide a random interval during which power module response messages are collected from power modules associated with the communication module and forwarded to the network server, the parameter may take values representing a random number, from 1 to n seconds, each pass.
- a 'INIT_PAN' parameter which may have a default value of FALSE and which may take a value of TRUE to instruct the processor to cleanup network data cached in communication module.
- a 'LOG_APPENDER' parameter to determine the status of the communication module log creation and archiving, the parameter may take values of 'OFF', 'FILE' or 'FTP' as required.

a 'LOG_URL' parameter to provide a URL of a FTP log location when the 'LOG_APPENDER' parameter has a value of 'FTP', the 'LOG_URL' parameter may take a value of a form '[user:pass@]host:[port]'.

a 'LOG_SIZE' parameter to provide the size of log file, the parameter may have a default value of 1024 kilobytes and may take a value of between 50 KB to 5 MB as required.

For example a possible Configuration Report Message may take a form such as:

```
REQ(POST): POWERMATRIX_GW_CONFIG [{
"MESSAGE_TYPE": "POWERMATRIX_GW_CONFIG",
"MESSAGE_ID": "200",
"VERSION": "0.2",
"TIMESTAMP":"2012-11-22T14:12:38Z",
"GW_ID": "ABCDEFABCDEFABCD",
"FIRMWARE_VERSION": "3.1",
"SOFTWARE_VERSION": "4.4",
"FREE_MEMORY": "240",
"FREE_FLASH": "2000",
"CPU": "25",
"REASON":"RESET" / "BY_REQUEST"
},...]
``` which may elicit a Configuration Response Message such as:

```
RESP :[{
"MESSAGE_TYPE": "POWERMATRIX_GW_CONFIG",
"VERSION": "0.2",
"MESSAGE_ID":"253",
"FIRMWARE_VERSION": "2.1",
"SW_VERSION": "2.0",
"UPDATE_FIRMWARE": "TRUE" / "FALSE",
"UPDATE_SOFTWARE": "TRUE" / "FALSE",
"REBOOT": "0",
"AGGREGATION_INTERVAL": "5",
"INIT_PAN": "TRUE" / "FALSE",
"LOG_APPENDER": "OFF" / "FILE" / "FTP",
"LOG_URL": "[user:pass@]host:[port]",
"LOG_SIZE":"1024"
}]
```

Figure 8F:
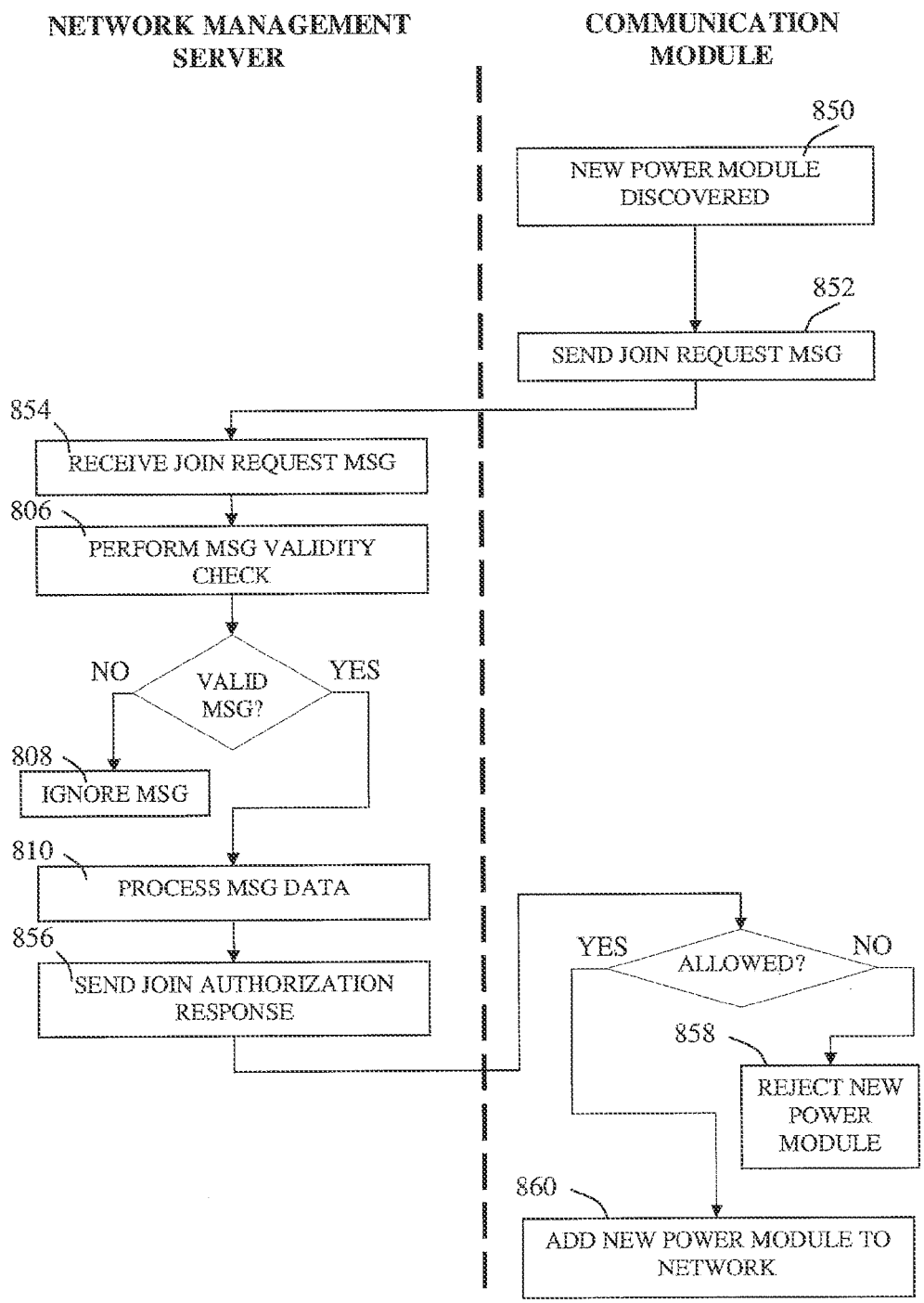

Referring now to the flowchart FIG. 8F, selected actions are presented of a Join Request communication between the communication module and the network management server. A Join Request Message is a transaction request from the communication module to the network management server for permission to add a new power module to the network. Accordingly, a Join Request Message may be sent to the network management server 852 when a new power module is discovered 850.

Amongst others, parameters of a Join Request Message may include:

a 'MESSAGE_TYPE' parameter to provide a Message name such as "POWERMATRIX_TX_JOIN", a 'VERSION' parameter to provide the version of message format thereby enabling the management server to be compatible with multiple communication protocols, a 'MESSAGE_ID' parameter to provide sequential numbers used in validity checks to detect data loss and ensure sequencing, the value of this parameter may be a repeating sequence from 1 to 255, a 'TIMESTAMP' parameter to provide a UTC-based report time having a format: YYYY-MM-DDTHH:MM:SSZ where '-', ':', 'T' and 'Z' are constant values.

a 'GW_ID' parameter to provide a unique MAC address identifier of the communication module, this parameter may have a value of a 12 digit hex address without separators, for example '37290B2597A8'.

a 'TX_ID' parameter to provide a unique MAC address identifier of the Power Module, this parameter may have a value of a 12 digit hex address without separators, for example "F05DC8011FFB".

The network management server may receive the Join Request Message 854 and perform a message validity check 806. If the message is deemed invalid, for example if the message ID is not sequential as described above, the message may be ignored 808. Otherwise, the message data is processed 810 and an authorization response is generated to be sent back to the communication module 856. Where required, rules may be applied to the request, for example, a Power Module ID (TxID) may need to be previously registered with the network and not have already joined through another communication module to be allowed to be joined to the network.

The authorization response may be received by the Power Module and processed. Where approved the new power module may be added to the network 860, otherwise the new power module may be rejected 858.

Accordingly, the authorization message may have various parameters such as:

a 'MESSAGE_TYPE' parameter to provide a Message name such as "POWERMATRIX_ TX_JOIN", a 'VERSION' parameter to provide the version of message format thereby enabling the management server to be compatible with multiple communication protocols, a 'MESSAGE_ID' parameter to provide sequential numbers used in validity checks to detect data loss and ensure sequencing, the value of this parameter may be a repeating sequence from 1 to 255, a 'TIMESTAMP' parameter to provide a UTC-based report time having a format: YYYY-MM-DDTHH:MM:SSZ where '-', ':', 'T' and 'Z' are constant values.

a 'GW_ID' parameter to provide a unique MAC address identifier of the communication module, this parameter may have a value of a 12 digit hex address without separators, for example '4C766044FC3E'.

a 'TX_ID' parameter to provide a unique MAC address identifier of the Power Module, this parameter may have a value of a 12 digit hex address without separators, for example "F05DC8011FFB".

a 'COMMAND' parameter which may take a value of APPROVE to instruct the communication module processor to add the new power module to the network or a value of REJECT to instruct the communication module to reject the new power module.

For example a possible Join Request Message may take a form such as:

```
REQ(POST): POWERMATRIX_TX_JOIN [{
"MESSAGE_TYPE": "POWERMATRIX_TX_JOIN",
"MESSAGE_ID": "200",
"VERSION":"0",
"TIMESTAMP":"2012-11-22T14:12:38Z",
```

```
"GW_ID": "ABCDEFABCDEFABCD",
"TX_ID": "345345435",
"ZB_MAC": "ABCDEFABCDEF"
},...]
``` which may elicit an Authorization Response Message such as:

```
RESP :[{
"MESSAGE_TYPE": "POWERMATRIX_TX_JOIN",
"VERSION": "0",
"MESSAGE_ID":"253",
"TX_ID": "345345435",
"COMMAND":"APPROVE" / "REJECT"
}]
```

It will be appreciated that although, only a selection of message types and formats are described herein for illustrative purposes, other message types may be sent as required. In certain embodiments, empty messages may be sent by the communication module to the network management server periodically. Such empty messages may be used to elicit response messages from the network management server as required. In other embodiments, the network management server may not respond to a communication where there is no functional change required for the power module or the communication module. Still other message types and formats may be used in adapted protocol versions as will occur to those skilled in the art as required.

Technical and scientific terms used herein should have the same meaning as commonly understood by one of ordinary skill in the art to which the disclosure pertains. Nevertheless, it is expected that during the life of a patent maturing from this application many relevant systems and methods will be developed. Accordingly, the scope of the terms such as computing unit, network, display, memory, server and the like are intended to include all such new technologies a priori.

As used herein the term "about" refers to at least ±10%.

The terms "comprises", "comprising", "includes", "including", "having" and their conjugates mean "including but not limited to" and indicate that the components listed are included, but not generally to the exclusion of other components. Such terms encompass the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" may include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments or to exclude the incorporation of features from other embodiments.

The word "optionally" is used herein to mean "is provided in some embodiments and not provided in other embodiments". Any particular embodiment of the disclosure may include a plurality of "optional" features unless such features conflict.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween. It should be understood, therefore, that the description in range format is merely for convenience and brevity and should not be construed as an inflexible limitation on the scope of the disclosure. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6 as well as non-integral intermediate values. This applies regardless of the breadth of the range.

It is appreciated that certain features of the invention, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. Certain features described in the context of various embodiments are not to be considered essential features of those embodiments, unless the embodiment is inoperative without those elements.

Although the invention has been described in conjunction with specific embodiments thereof, it is evident that other alternatives, modifications, variations and equivalents will be apparent to those skilled in the art. Accordingly, it is intended to embrace all such alternatives, modifications, variations and equivalents that fall within the spirit of the invention and the broad scope of the appended claims.

Additionally, the various embodiments set forth hereinabove are described in terms of exemplary block diagrams, flow charts and other illustrations. As will be apparent to those of ordinary skill in the art, the illustrated embodiments and their various alternatives may be implemented without confinement to the illustrated examples. For example, a block diagram and the accompanying description should not be construed as mandating a particular architecture, layout or configuration.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a computer-readable medium such as a storage medium. Processors may perform the necessary tasks.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present disclosure. To the extent that section headings are used, they should not be construed as necessarily limiting.

The scope of the disclosed subject matter is defined by the appended claims and includes both combinations and sub combinations of the various features described hereinabove as well as variations and modifications thereof, which would occur to persons skilled in the art upon reading the foregoing description.

The invention claimed is:

1. A system for managing a wireless power transfer network, the system comprising:
    at least one wireless power outlet unit operable to transfer power to at least one electrical device associated with a wireless power receiver; and
    at least one management server in communication with said at least one wireless power outlet unit, said at least one management server operable to execute instructions directed to:
    receiving an identification code from said at least one wireless power outlet unit; and
    managing power transfer from said at least one wireless power outlet unit,
    wherein said managing power transfer is configured to determine power transfer conditions for said at least one wireless power outlet unit by a policy enforcement technique that is adapted to provide different levels of services selected from the group of levels consisting of administrator, Madmin, and Muser,
    wherein the policy enforcement technique is selected from the group of policies consisting of user identification, type of service, type of device, and a combination thereof, and
    wherein the user identification policy is selected from the group of actions consisting of user identification, location identification, starting time, ending time, duration of power transfer, and a combination thereof.

2. The system of claim 1, wherein said at least one management server is further operable to execute instructions directed to:
    monitoring health of said at least one wireless power outlet unit; and
    providing remote maintenance of said at least one wireless power outlet unit.

3. The system of claim 2, wherein said providing remote maintenance comprises performing a step selected from the group consisting of starting, stopping, restarting, software updating, controlling a visual user interface, controlling a user audio interface, and combinations thereof.

4. The system of claim 2, wherein said monitoring health comprises said wireless power outlet responding to a communication signal within a time-out limit.

5. The system of claim 4, wherein said communication signal is transmitted according to a schedule.

6. The system of claim 4, wherein said communication signal is transmitted upon demand.

7. The system of claim 1, wherein said at least one management server is further operable to communicate with said at least one electrical device.

8. The system of claim 1, wherein said managing power transfer is governed by at least one power management policy, wherein said at least one power management policy determines power transfer conditions for said at least one wireless power outlet unit.

9. The system of claim 8, wherein said at least one power management policy is selected from the group consisting of user identification policies, type of service policies, type of device policies, dynamic policies, and combinations thereof.

10. The system of claim 9, wherein said at least one power management policy is selected for said at least one wireless power outlet unit according to said identification code.

11. The system of claim 10, wherein said at least one wireless power outlet unit has a default power management policy to determine default power transfer conditions.

12. The system of claim 11, wherein the selected power management policy replaces said power management default policy.

13. The system of claim 12, wherein said at least one power management policy is distributed in response to a change of said at least one power management policy on said at least one management server.

14. The system of claim 12, wherein said at least one power management policy is distributed according to a distribution schedule.

15. The system of claim 12, wherein said at least one power management policy is distributed upon a communication request from said at least one wireless power outlet unit.

16. The system of claim 9, wherein said user identification policies comprise actions selected from the group consisting of user identification, location identification, starting time, ending time, duration of power transfer, and combinations thereof.

17. The system of claim 9, wherein said type of service policies determine the level of current applied at power transfer from said at least one wireless power outlet.

18. The system of claim 9, wherein said dynamic policies comprise actions selected from the group consisting of real time management of power consumption, real time management of battery health, location traffic control, historical usage data analysis, and combinations thereof.

19. The system of claim 18, wherein said historical usage data analysis is selected from the group consisting of usage analysis of said at least one wireless power outlet unit, usage analysis of a user, usage analysis of a group of users, and combinations thereof.

20. A computer implemented method for managing a wireless power transfer network, the wireless power transfer network comprising: (1) at least one wireless power outlet unit operable to transfer power to at least one electrical device associated with a wireless power receiver; and (2) at least one management server in communication with said at least one wireless power outlet unit, and further in communication with a management database, the method comprising:
    said at least one management server, receiving an identification code from said least one wireless power outlet unit; and said at least one management server, managing power transfer from said at least one wireless power outlet unit, wherein said at least one management server is configured to determine power transfer conditions for said at least one wireless power outlet unit by a policy enforcement technique that is adapted to provide different levels of services selected from the group of levels consisting of administrator, Madmin, and Muser, wherein the policy enforcement technique is selected from the group of policies comprising user identification, type of service, type of device, and a combination thereof, and wherein the user identification policy is selected from the group of actions consisting of user identification, location identification, starting time, ending time, duration of power transfer, and a combination thereof.

* * * * *